United States Patent
Morita et al.

(10) Patent No.: US 8,077,243 B2
(45) Date of Patent: Dec. 13, 2011

(54) VIDEO OUTPUT DEVICE AND OSD FORCED DISPLAY METHOD OF VIDEO OUTPUT DEVICE

(75) Inventors: Kenji Morita, Tokyo (JP); Tatsuhito Tabuchi, Tokyo (JP); Mayumi Kamiya, Tokyo (JP)

(73) Assignee: Sony Corporation (JP)

( * ) Notice: Subject to any disclaimer, the term of this patent is extended or adjusted under 35 U.S.C. 154(b) by 433 days.

(21) Appl. No.: 12/316,316

(22) Filed: Dec. 11, 2008

(65) Prior Publication Data

US 2009/0174818 A1  Jul. 9, 2009

(30) Foreign Application Priority Data

Dec. 14, 2007  (JP) ................................ P2007-323873

(51) Int. Cl.
*H04N 5/222* (2006.01)

(52) U.S. Cl. ......... 348/333.04; 348/333.01; 348/333.02; 348/333.05

(58) Field of Classification Search .................. None
See application file for complete search history.

(56) References Cited

U.S. PATENT DOCUMENTS

| | | | | |
|---|---|---|---|---|
| 2001/0011992 A1* | 8/2001 | Juen et al. | ...................... | 345/156 |
| 2004/0105024 A1* | 6/2004 | Takahashi | ................ | 348/333.01 |
| 2006/0055790 A1* | 3/2006 | Chen et al. | .................. | 348/211.2 |
| 2006/0098091 A1* | 5/2006 | Chun | ............................. | 348/143 |
| 2006/0103751 A1* | 5/2006 | Lee | ............................ | 348/333.02 |
| 2007/0132853 A1 | 6/2007 | Shiota et al. | | |
| 2007/0271525 A1* | 11/2007 | Han et al. | ....................... | 715/786 |
| 2008/0198142 A1* | 8/2008 | Juen et al. | ...................... | 345/173 |
| 2011/0037694 A1* | 2/2011 | Juen et al. | ...................... | 345/157 |

FOREIGN PATENT DOCUMENTS

| | | |
|---|---|---|
| JP | 2005-301992 A | 10/2005 |
| JP | 2006-285065 A | 10/2006 |
| JP | 2007-067730 A | 3/2007 |
| JP | 2007-124377 A | 5/2007 |
| JP | 2007-129599 A | 5/2007 |
| JP | 4020162 B1 | 12/2007 |
| WO | 2007-074611 A1 | 7/2007 |

\* cited by examiner

*Primary Examiner* — Lin Ye
*Assistant Examiner* — John H Morehead, III
(74) *Attorney, Agent, or Firm* — Lerner, David, Littenberg, Krumholz & Mentlik, LLP

(57) ABSTRACT

A video output device includes an OSD generation means for generating OSD (On Screen Display) for controlling the device itself, a detection means for detecting a connected state in which the device is connected to a prescribed external display device in a state realizing a mutual device control function which can perform control between devices mutually and a forced output means for outputting the OSD generated by the OSD generation means to the external display device forcibly and displaying the OSD on a display portion of the external display device regardless of any setting of the device when detecting the connected state by the detection means.

9 Claims, 18 Drawing Sheets

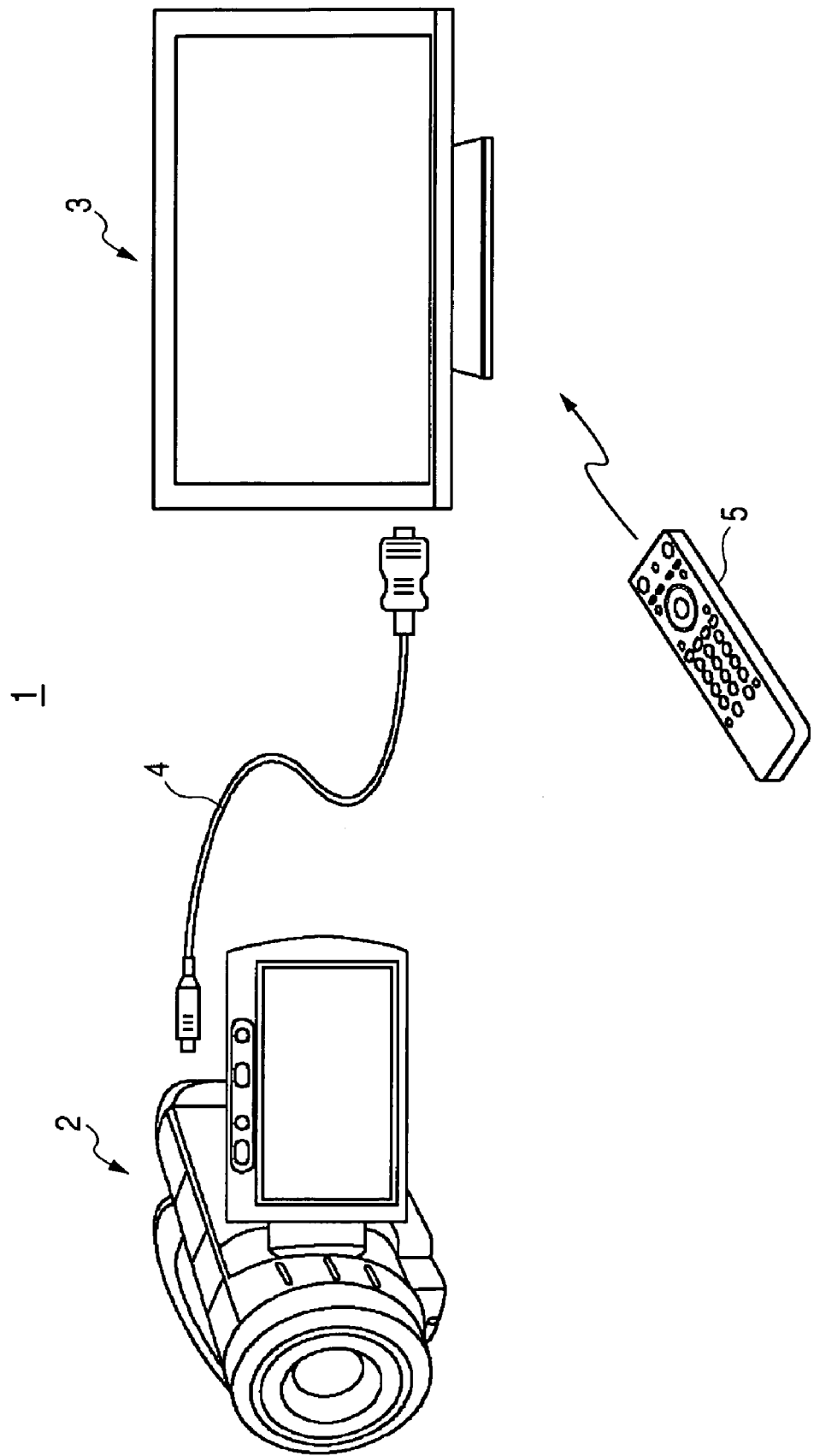

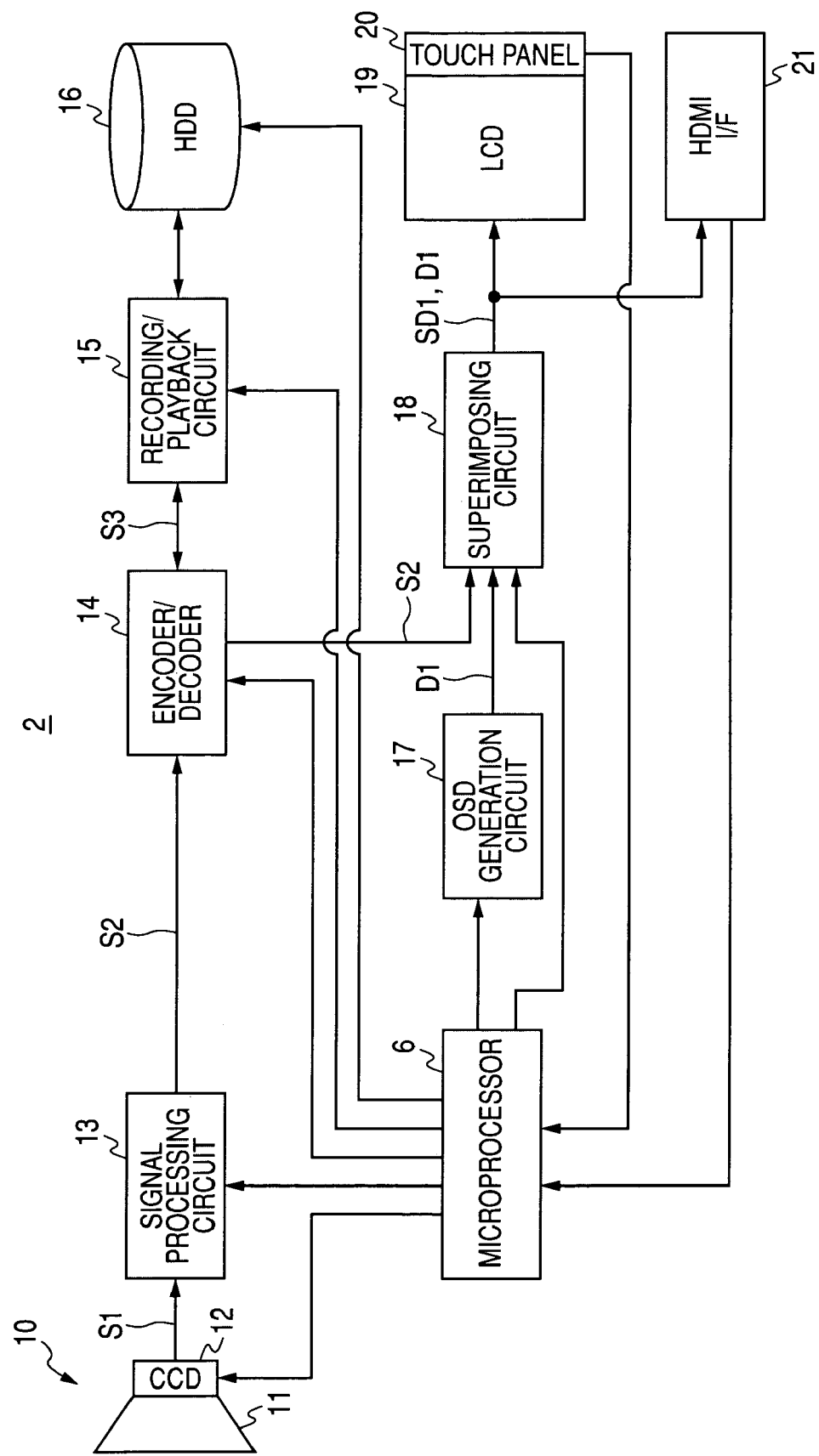

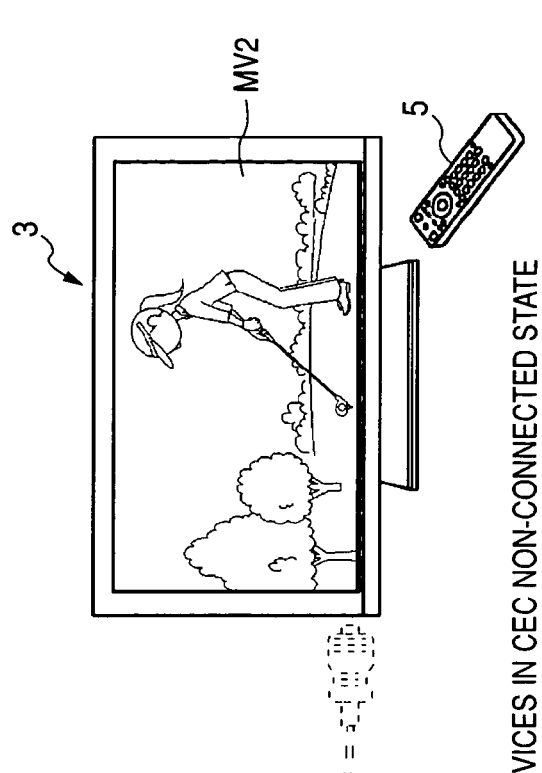
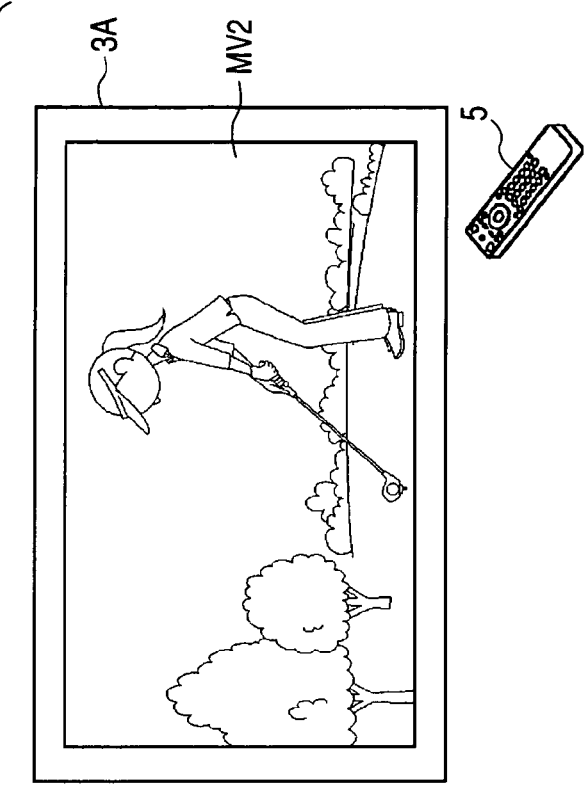
FIG. 3A CEC NON-CONNECTED STATE
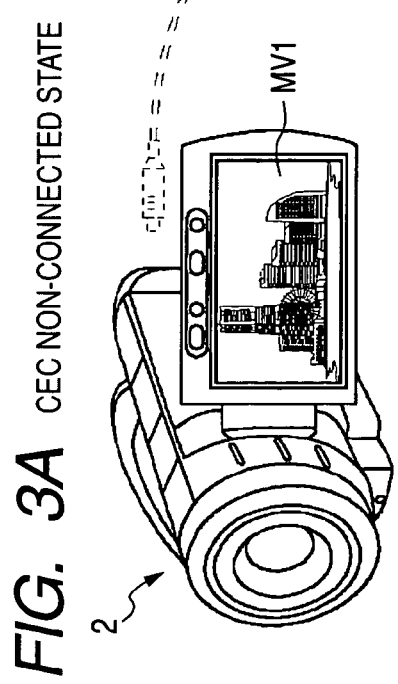
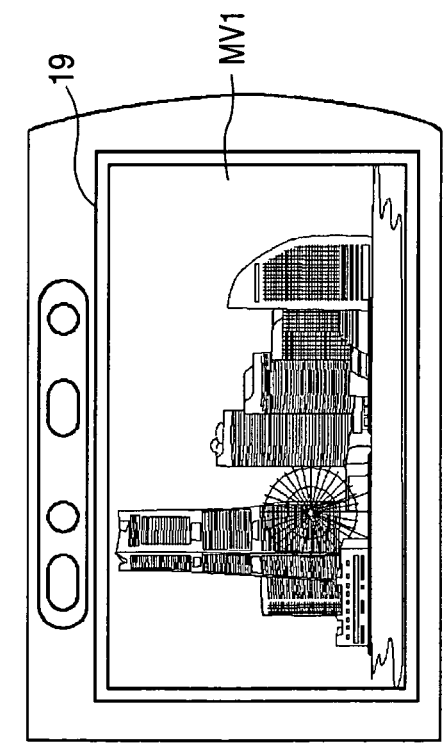
FIG. 3B DISPLAY CONTENTS OF RESPECTIVE DEVICES IN CEC NON-CONNECTED STATE

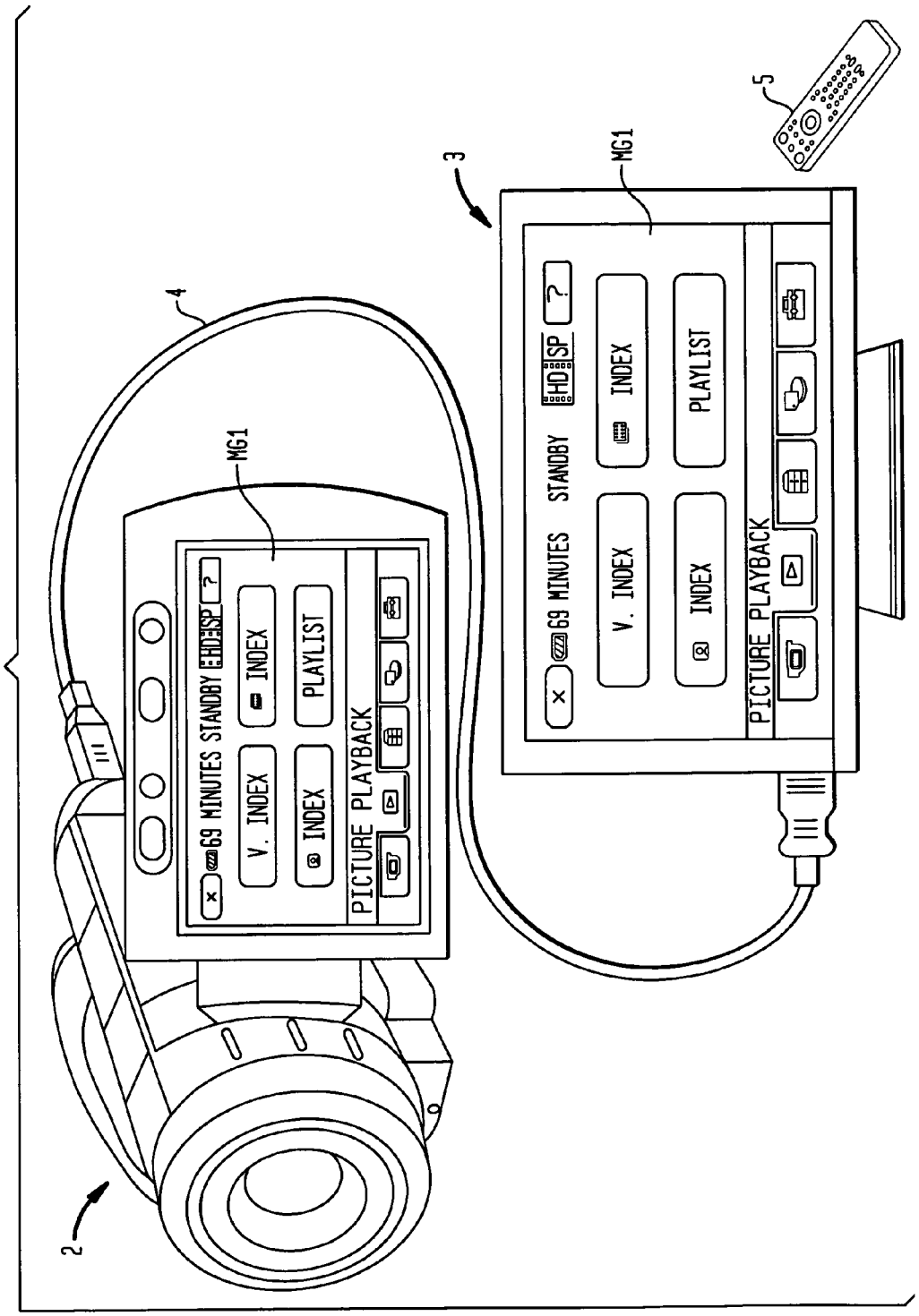

DISPLAY CONTENTS OF RESPECTIVE DEVICES IN CEC CONNECTED STATE

CEC CONNECTED STATE

DISPLAY CONTENTS OF RESPECTIVE DEVICES DURING PLAYBACK PROCESSING IN CEC CONNECTED STATE (1)

CEC CONNECTED STATE

DISPLAY CONTENTS OF RESPECTIVE DEVICES DURING PLAYBACK PROCESSING IN CEC CONNECTED STATE

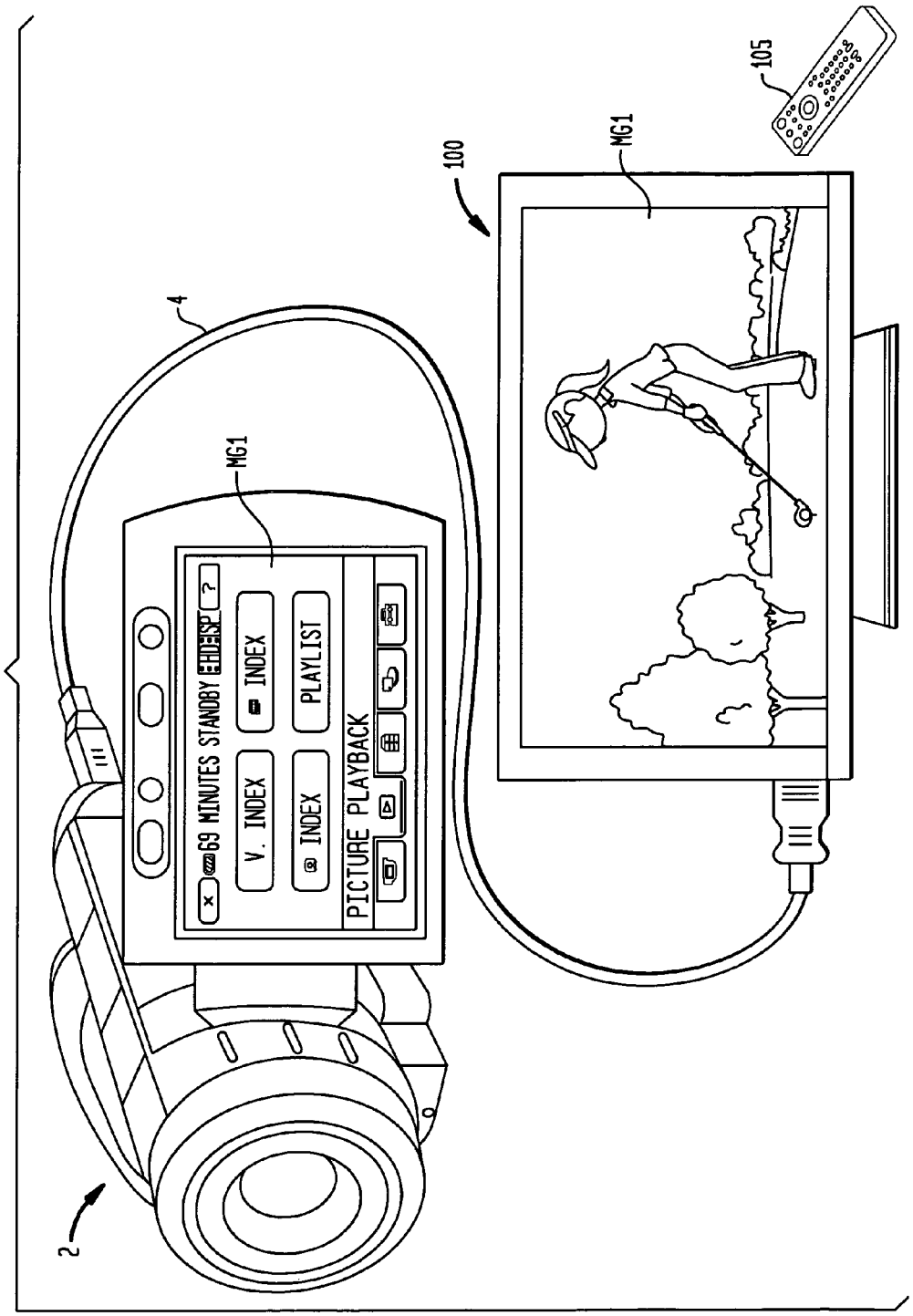

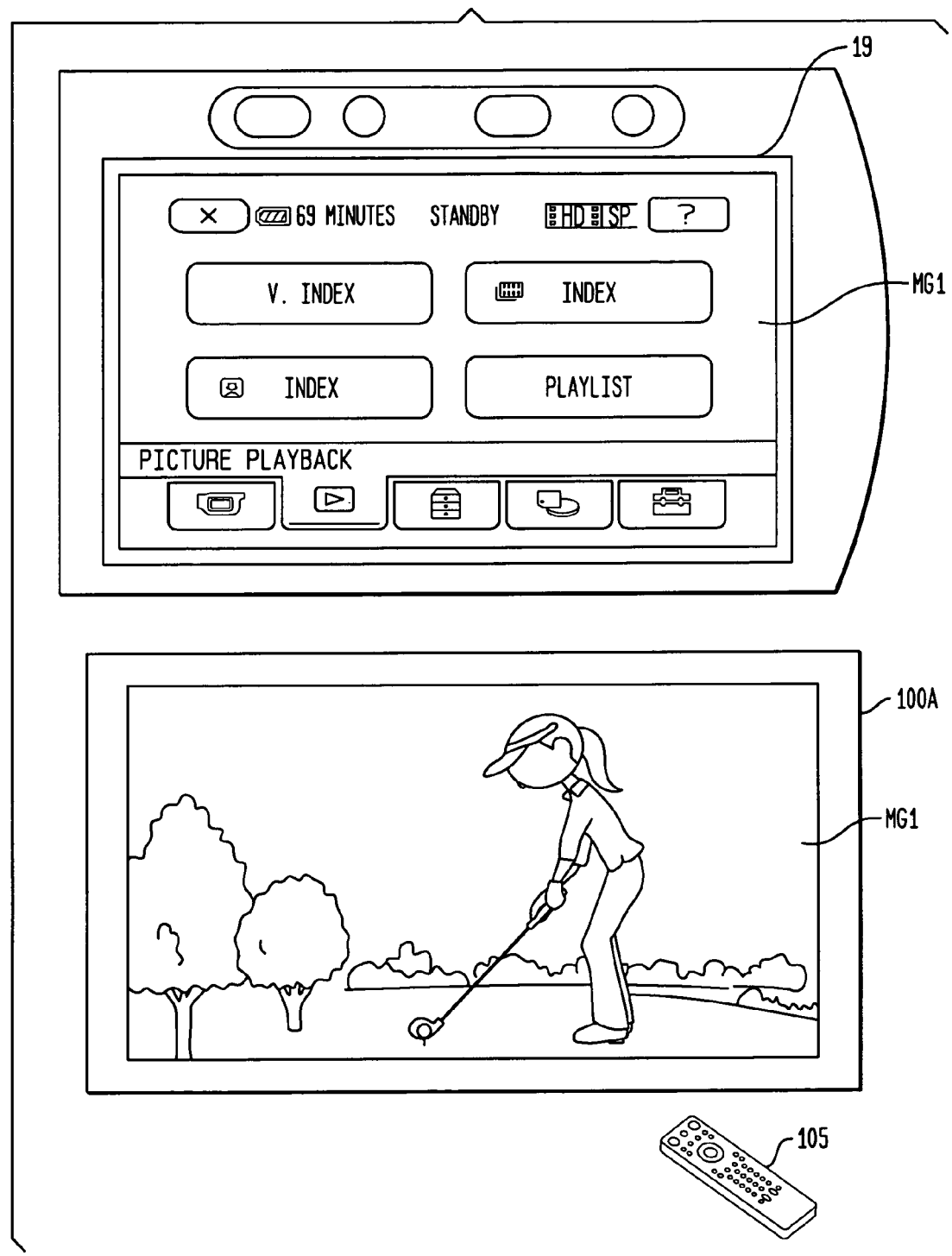

VIDEO OUTPUT DEVICE AND OSD FORCED DISPLAY METHOD OF VIDEO OUTPUT DEVICE

CROSS REFERENCES TO RELATED APPLICATIONS

The present application claims priority from Japanese Patent Application No. JP 2007-323873, filed in the Japanese Patent Office on Dec. 14, 2007, the entire content of which is incorporated herein by reference.

BACKGROUND OF THE INVENTION

1. Field of the Invention

The present invention relates to a video output device and an OSD forced display method of the video output device, which are preferably applied to, for example, a digital video camera and a digital camera.

2. Description of the Related Art

In related arts, there is a technique in a digital camera, in which an operation key image is displayed on a panel display of the digital camera, an image including operation menus is displayed on an external display device, and operation input is allowed to be accepted by the operation key image of the panel display of the digital camera while a user visually checks the image including operation menus on the external display device (for example, refer to JP-A-2007-67730 (Patent Document 1)).

In this case, the user have to operate the operation key image displayed on the panel display of the digital camera while visually checking the image including operation menus displayed on the external display device, which means that the user have to perform the operation while observing both the external display device and the digital camera.

Also in related arts, when a digital video camera is connected to a television (hereinafter, refer to as a TV), it is difficult to operate the digital video camera by a remote controller of the TV (hereinafter, refer to as a TV remote controller), and it is necessary to consistently operate the digital video camera by a remote controller of the digital video camera (hereinafter, refer to as a camera remote controller).

That is to say, even in the case that the digital video camera is connected to the TV, it is necessary to use the camera remote controller when operating the digital video camera and it is necessary to use the TV remote controller when operating the TV, therefore, operationality is extremely inferior.

Accordingly, CEC (Consumer Electronics Control) is used, in which the digital video camera and the TV are mutually connected through a HDMI cable which is an interface of a HDMI (High Definition Multimedia Interface) standard, whereby the digital video camera can be operated by the operation of the TV remote controller with respect to the TV.

The CEC is a device control signal and a control protocol standardized by the HDMI, which is a mutual device control function which can control respective devices (in this case, the digital video camera and the TV) mutually.

SUMMARY OF THE INVENTION

In the digital video camera having the above configuration, there is a problem that it is difficult that the user determines whether the connection between the digital video camera and the TV is established or not, because a specification for notifying the user that the digital video camera and the TV have been connected in a state in which the mutual device control function can be realized (hereinafter, referred to as a CEC connection) is not standardized.

Additionally, when the digital video camera and the TV are connected by the CEC connection, OSD (On Screen Display) which is displayed by being outputted by the digital video camera can be operated by the user using the TV remote controller, however, the OSD is not always set to be outputted from the digital video camera to the TV.

In such case, it is necessary that the digital video camera performs setting so that the OSD is outputted from the digital video camera to the TV, therefore, there is a problem that it is difficult to control the digital video camera by the operation of the TV remote controller with respect to the TV immediately even when the digital video camera and the TV are connected by the CEC connection, which leads to inferior operationality.

Furthermore, when the digital video camera performs setting so that the OSD is outputted to the TV once, the OSD keeps on being outputted to the TV, therefore, there is a problem that the OSD is annoying the user who desires to concentrate on viewing video displayed on the TV and it is necessary to change the setting of the digital video camera for stopping the output of the OSD, which lead to inferior operationality.

The invention has been made in view of the above, and it is desirable to provide a video output device which is configured to be able to operate and control the video output device by an external display device immediately when the video output device and the external display device are connected in a state in which the mutual device control function can be realized and an OSD forced display method of the video output device therefor which is capable of displaying a control screen to the external display device.

According to an embodiment of the invention, a video output device includes an OSD generation means for generating OSD (On Screen Display) for controlling the device itself, a detection means for detecting a connected state in which the device is connected to a prescribed external display device in a state realizing a mutual device control function which can perform control between devices mutually and a forced output means for outputting the OSD generated by the OSD generation means to the external display device forcibly and displaying the OSD on a display portion of the external display device regardless of any setting of the device when detecting the connected state by the detection means.

According to this, when the video output device is connected to the external display device in the state realizing a mutual device control function, the OSD for controlling the video output device itself from the external display device can be displayed forcibly on the display portion of the external display device regardless of any setting of the video output device, therefore, the user can control the video output device from the external display device immediately at the point when the video output device and the external display device are connected without any special operation.

According to an embodiment of the invention, an OSD forced display method of a video output device includes the steps of detecting a connected state in which the video output device and a prescribed external display device are connected in a state realizing a mutual device control function which can perform control between devices mutually by a detection means of the video output device, generating OSD (On Screen Display) for controlling the video output device itself by an OSD generation means when the connected state is detected in the detection step and outputting the OSD generated in the step of generating the OSD to the external display device forcibly by a forced output means of the video output device and displaying the OSD on a display portion of the external display device regardless of any setting of the video output device.

According to this, when the video output device is connected to the external display device in the state realizing a mutual device control function, the OSD for controlling the video output device itself from the external display device can be displayed forcibly on the display portion of the external display device regardless of the setting the video output device, therefore, the user can control the video output device from the external display device immediately at the point when the video output device and the external display device are connected without any special operation.

According to an embodiment of the invention, when the video output device is connected to the external display device in the state realizing a mutual device control function, the OSD for controlling the video output device itself from the external display device can be displayed forcibly on the display portion of the external display device regardless of any setting of the video output device, therefore, the user can control the video output device from the external display device immediately at the point when the video output device and the external display device are connected without any special operation. Accordingly, a video output device which can operate and control the video output device from the external display device immediately when the video output device and the external display device are connected in the state realizing a mutual device control function, and an OSD forced display method for that, which can display a control screen with respect to the external display device can be realized.

BRIEF DESCRIPTION OF THE DRAWINGS

FIG. 1 is a schematic perspective view showing the whole configuration of a video playback system;

FIG. 2 is a schematic block diagram showing a circuit configuration of a digital video camera;

FIG. 3A and FIG. 3B are schematic views for explaining an OSD output control pattern in a CEC non-connected state;

FIG. 4A and FIG. 4B are schematic views for explaining an OSD output control pattern at the time of first transition to a CEC connected state;

FIG. 14A and FIG. 14B are schematic views for explaining an OSD output control pattern when the CEC-compliant digital video camera and the CEC non-compliant TV are connected in another embodiment.

DESCRIPTION OF THE PREFERRED EMBODIMENTS

Figure 4B:
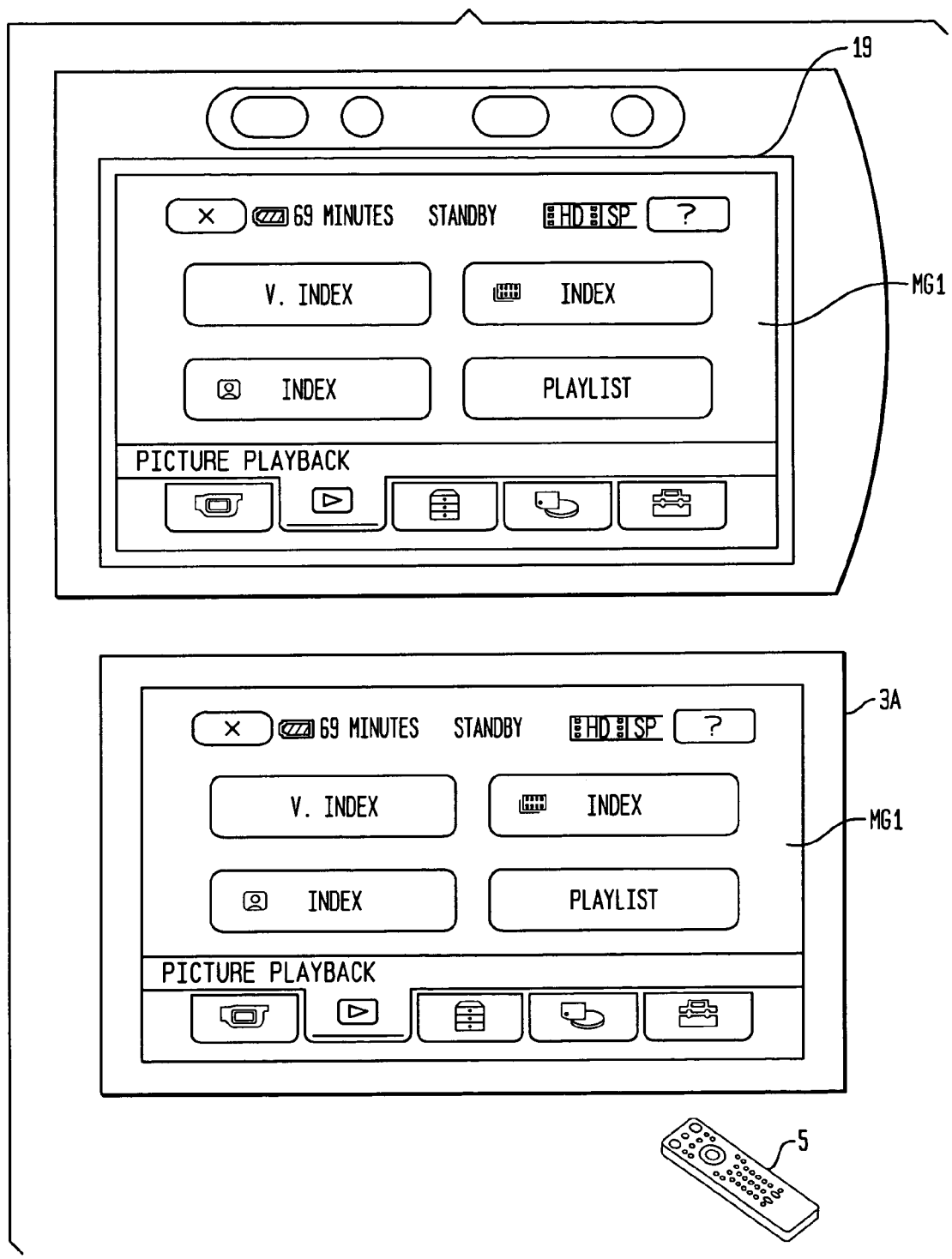

Hereinafter, an embodiment of the invention will be described with reference to the drawings.

(1) The Whole Configuration of a Video Playback System

In FIG. 1, 1 denotes a video playback system as a whole, having a configuration in which a digital video camera 2 and a TV 3 corresponding to full HD (High Definition) of 1920× 1080 pixels are connected by an HDMI cable 4.

Note that the digital video camera 2 and the TV 3 both comply with a CEC standard, which can be connected by the CEC connection when they are connected to each other by the HDMI cable 4.

Accordingly, in the video playback system 1, when the digital video camera 2 and the TV 3 are CEC-connected in a state in which they can realize the mutual device control function by the HDMI cable 4, and menus, operation buttons and the like in a form of OSD for controlling the digital video camera 2 are displayed on the TV 3, the digital video camera 2 can be operated indirectly by OSD operation from the TV remote controller 5 with respect to TV 3.

(2) The Circuit Configuration of Digital Video Camera

As shown in FIG. 2, in the digital video camera 2, a microprocessor 6 including a CPU (Central Processing Unit) performs various processing such as imaging processing, playback processing and CEC connection processing in accordance with a basic program activated from a hard disc drive 16 and various application programs as well as totally controlling the whole system.

Actually, the digital video camera 2 allows a subject to be imaged to be focused on an imaging device 12 formed by a CCD (charge Coupled Device) or the like by a lens 11 in an imaging unit 10, outputting a video signal S1 obtained as the result to a signal processing unit 13 at the time of taking images.

The signal processing unit 13 performs processing such as gamma correction, AGC (Auto Gain Control) with respect to the video signal S1, converts the video signal S1 into digital video data S2, then, transmits the video data 2 to an encoder/decoder 14.

The encoder/decoder 14 performs compressed encoding processing to the video data S2 in accordance with a prescribed compressed encoding method, writing a compressed video data S3 obtained as the result in the hard disc drive 16 through a recording/playback circuit 15.

The digital video camera 2 also reads the compressed video data S3 written in the hard disc drive 16 through the recording/playback circuit 15 at the time of playback, uncompressing the original video data S2 by decoding the data by the encoder/decoder 14, then, outputting the data to the LCD 19 through a superimposing circuit 18 to display playback video in accordance with the video data S2 on the LCD 19.

The microprocessor 6 of the digital video camera 2 includes an HDMI interface 21, and when recognizing that the digital video camera 2 is connected to the TV 3 by the CEC connection from the HDMI interface 21 through the HDMI cable 4 (FIG. 1), the microprocessor 6 generates various playback control buttons such as menu items, operation buttons and the like for controlling the digital video camera 2 as OSD data D1 by an OSD generation circuit 17, transmitting the data to the superimposing circuit 18.

When the superimposing circuit 18 receives supply of the video data S2 which has been played back from the encoder/decoder 14, the superimposing circuit 18 superimposes the OSD data D1 supplied from the OSD generation circuit 17 on the video data S2, outputs OSD superimposed video data SD1 obtained as the result to the LCD 19 and outputs the data to the TV 3 from the HDMI interface 21 through the HDMI cable 4.

When the superimposing circuit 18 does not receive the supply of the video data S2 which has been played back from the encoder/decoder 14, the superimposing circuit 18 outputs only the OSD data D1 supplied from the OSD generation circuit 17 to the LCD 19 and outputs the data to the TV 3 from the HDMI interface 21 through the HDMI cable 4.

The microprocessor 6 of the digital video camera 2 is configured to be able to set various states in the digital video camera 2 in accordance with touch operation by the user with respect to a touch panel 20 provided at the front of the LCD 19, thereby allowing the user to select either an output state in which OSD is outputted to the TV 3 to be connected or a non-output state in which OSD is not outputted.

(3) OSD Output Control Patterns According to the CEC Connected State

Next, OSD output control patterns of the digital video camera 2 in various states such as before the CEC connection or at the time of the CEC connection between the digital video camera 2 and the TV 3 in the video playback system 1 will be explained.

In the case of the CEC non-connected state in which the digital video camera 2 and the TV 3 are not connected by the HDMI cable 4 in the video playback system 1 as shown in FIG. 3A, the contents of video MV1 displayed on the LCD 19 of the digital video camera 2 and the contents of video MV2 displayed on a monitor 3A of the TV 3 are different in principle as shown in FIG. 3B, and OSD of the digital video camera 2 is not displayed on the monitor 3A of the TV 3.

On the other hand, at the first transition to the CEC connected state by physical connection between the digital video camera 2 and the TV 3 through the HDMI cable 4 in the video playback system 1 as shown in FIG. 4A, the digital video camera 2 displays a menu screen MG1 including plural menu items in the form of OSD on the LCD 19 and outputs the menu screen MG1 to the TV3 forcibly as shown in FIG. 4B.

Accordingly, the TV 3 can display the menu screen MG1 supplied from the digital video camera 2 on the monitor 3A and can accept selection and determination with respect to the menu items in the menu screen MG1 displayed on the monitor 3A from the TV remote controller 5.

Figure 5:
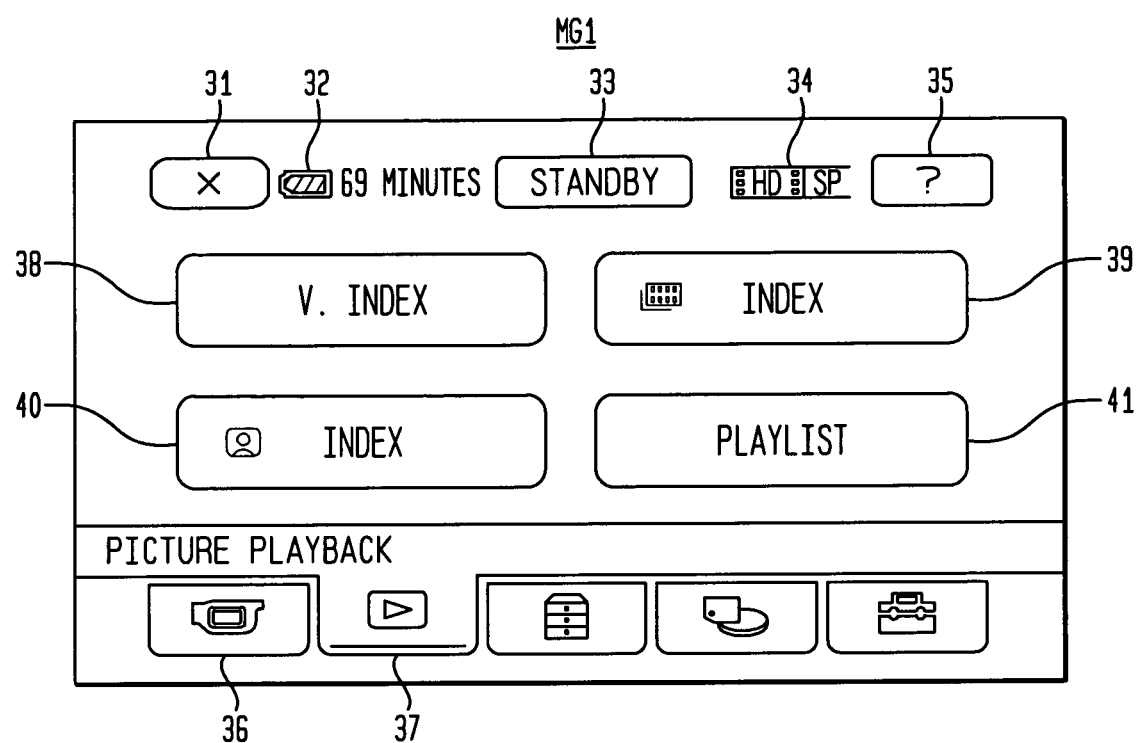
FIG. 5 is a schematic view showing a configuration of a menu screen.

As shown in FIG. 5, in the menu screen MG1, there are provided as a form of OSD, a "close" button 31 for closing the screen, a "battery" icon 32 indicating the battery remaining amount, a "playback mode information" icon 33, a "recording mode" icon 34 indicating an "HDHQ" mode in which full HD video data including 1920×1080 pixels is recorded at a transfer speed of 35[Mbps] or an "HDSP" mode in which full HD video data including 1920×1080 pixels is recorded at a transfer speed of 25 [Mbps], a "help" icon 35, a "picture recording" button 36, a "picture playback" button 37 and the like.

In the menu screen MG1, a "visual-index" button 38 indicating four types of playback modes, a "film-index" button 39, a "face-index" button 40 and a "playlist" button 41 are also provided in the form of OSD.

The "visual-index" button 38 in the menu screen MG1 executes a playback function which is most fundamental for the digital video camera 2, which corresponds to a normal playback mode in which first scenes of plural video contents recorded in the internal hard disc drive 16 are displayed in thumbnail view, and when any of them is selected, a video content of the selected scene is played back from beginning to end.

Figure 6:
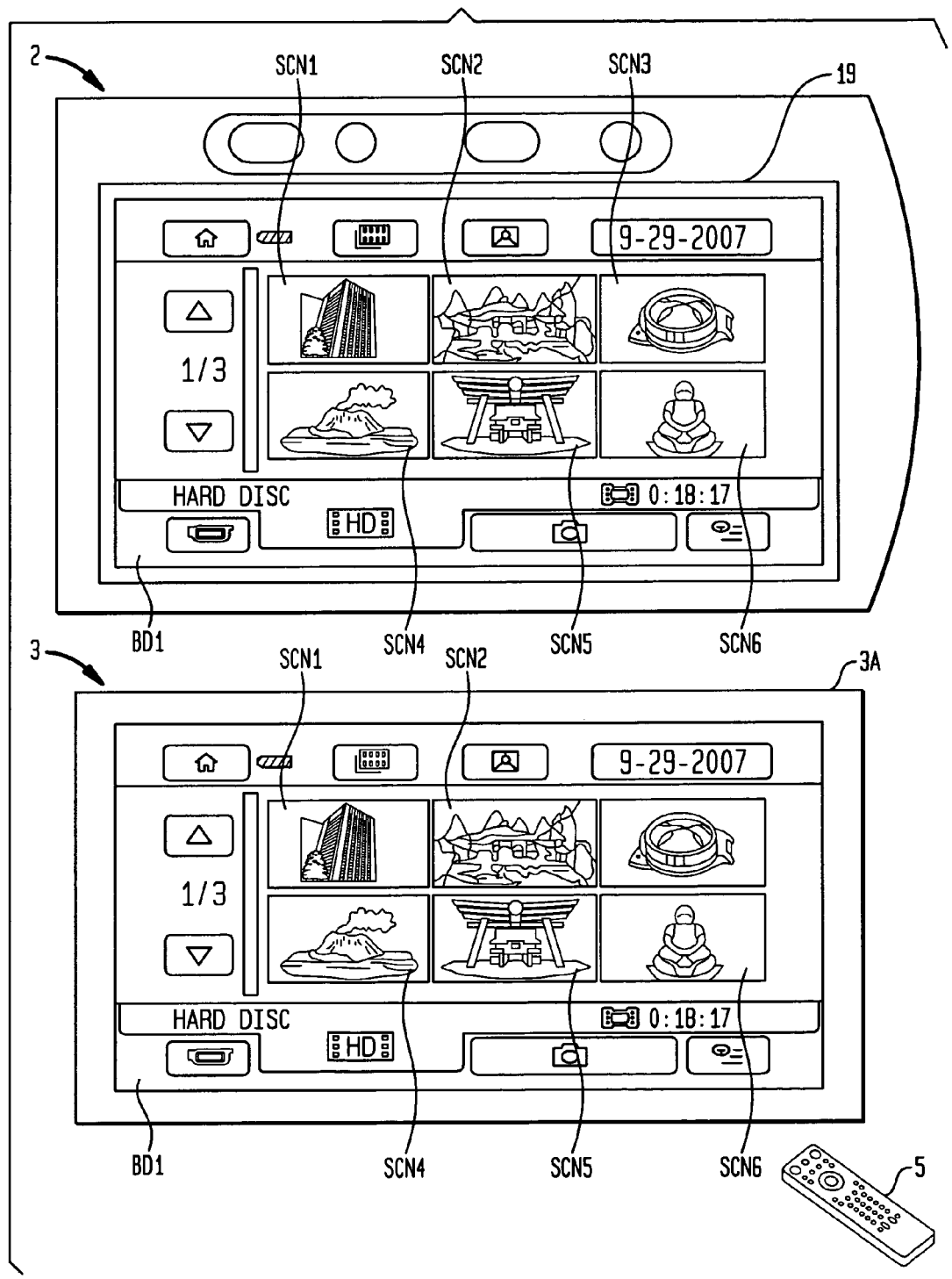
FIG. 6 is a schematic view showing a configuration of a visual-index screen.

Actually, the microprocessor 6 of the digital video camera 2, when recognizing that the "visual-index" button 38 in the menu screen MG1 of the OSD displayed on the monitor 3A of the TV 3 has been selected by the user operation using the TV remote controller 5, generates a visual-index screen BD1 as shown in FIG. 6 based on the plural video contents stored in the hard disc drive 16, and displays the screen on the LCD 19 as well as on the monitor 3A of the TV 3.

In the visual-index screen BD1, "scene" icons SCN1 to SCN6 respectively indicating first scenes in the plural video contents which can be played back normally are displayed in thumbnail view as the OSD, which provides the plural video contents which can be played back by the digital video camera 2 to the user visually through the "scene" icons SCN1 to SCN6.

Accordingly, the TV 3 can display the visual-index screen BD1 supplied from the digital video camera 2 on the monitor 3A and can accept selection and determination with respect to the "scene" icons SCN1 to SCN6 in the visual-index screen BD1 from the TV remote controller 5.

Figure 7:
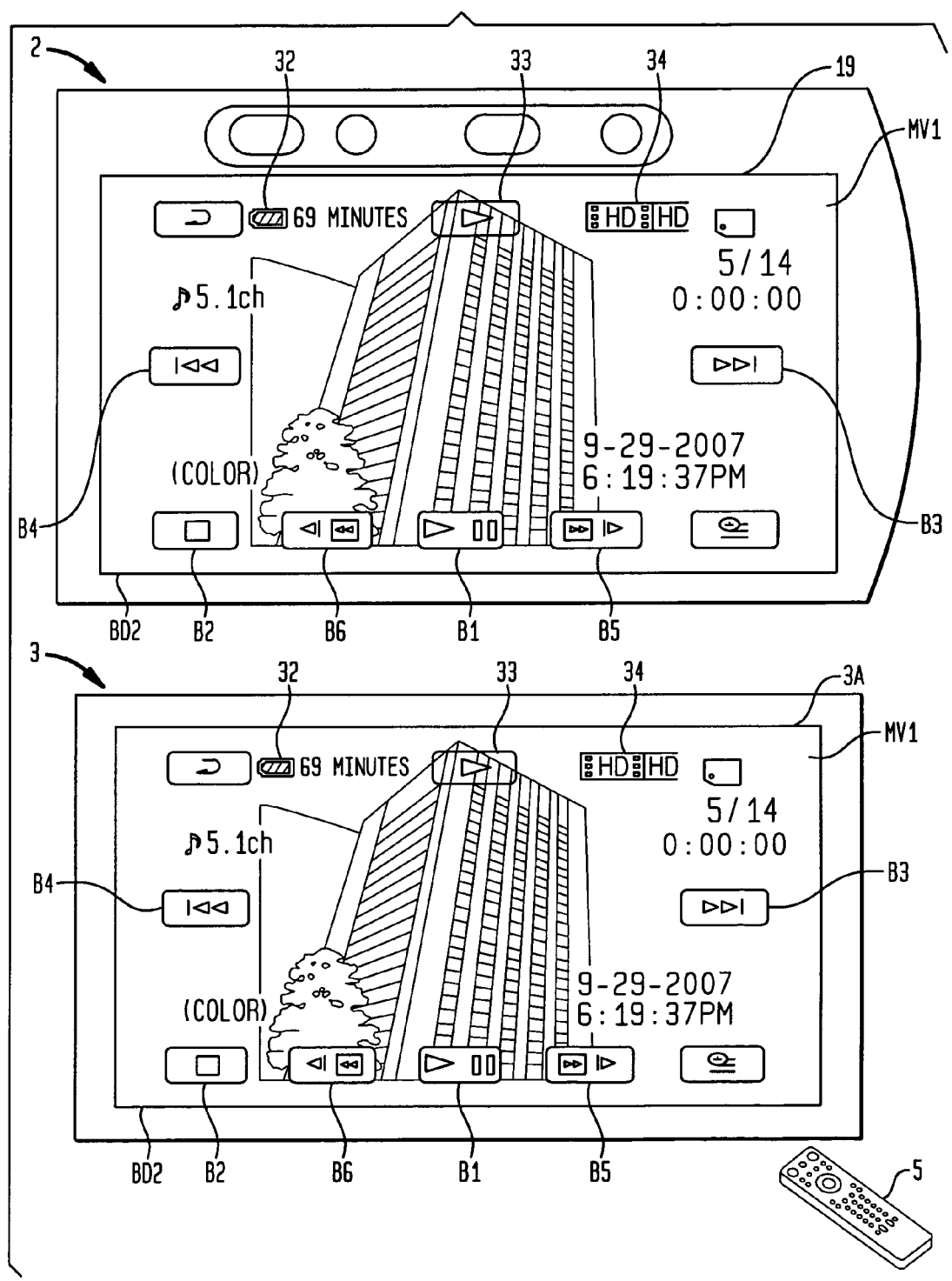
FIG. 7 is a schematic view for explaining OSD superimposed video.

Therefore, when any of the "scene" icons SCN1 to SCN6 in the visual-index screen BD1 displayed on the monitor 3A of the TV 3 is selected by the TV remote controller 5, the microprocessor 6 of the digital video camera 2 plays back a video content corresponding to, for example, the selected "scene" icon SCN1 from beginning to end, displaying the playback video MV1 at that time on the LCD 19 as well as on the monitor 3A of the TV 3 as shown in FIG. 7 in which the same signs are put on corresponding parts in FIG. 5.

At the same time, the microprocessor 6 of the digital video camera 2 generates OSD superimposed video data SD1 (FIG. 2) by superimposing playback control buttons such as a "playback/pause" button B1, a "stop" button B2, a "fast-forward" button B3, a "fast-rewinding" button B4, a "forward-side skip" button B5, a "rewinding-side skip" button B6 and the like on the playback video MV 1 as OSD, displaying OSD superimposed video BD2 based on the OSD superimposed video data SD1 on the LCD 19 as well as on the monitor 3A of the TV 3.

Accordingly, the TV 3 can display the OSD superimposed video BD2 based on the OSD superimposed video data SD1 supplied from the digital video camera 2 on the monitor 3A and can accept selection and determination with respect to the playback control buttons in the form of OSD of the OSD superimposed video data BD2 from the TV remote controller 5.

That is to say, when any of the "playback/pause" button B1, the "stop" button B2, the "fast-forward" button B3, the "fast-rewinding" button B4, the "forward-side skip" button B5, the "rewinding-side skip" button B6 of the OSD superimposed video BD2 displayed on the monitor 3A of the TV 3 is selected and determined, the microprocessor 6 of the digital video camera 2 performs playback processing in accordance with the instruction at that time, displaying the playback result on the LCD 19 as well as on the monitor 3A of the TV 3.

Next, the "film-index" button 39 in the menu screen MG1 (FIG. 5) corresponds to a scene search mode in which one video content recorded in the internal hard disc drive 16 is sectioned at predetermined time intervals (for example, 3 seconds) and a content portion including a most desired scene for the user can be easily searched by allowing the user to perform selection optionally from the sectioned plural content portions.

Figure 8:
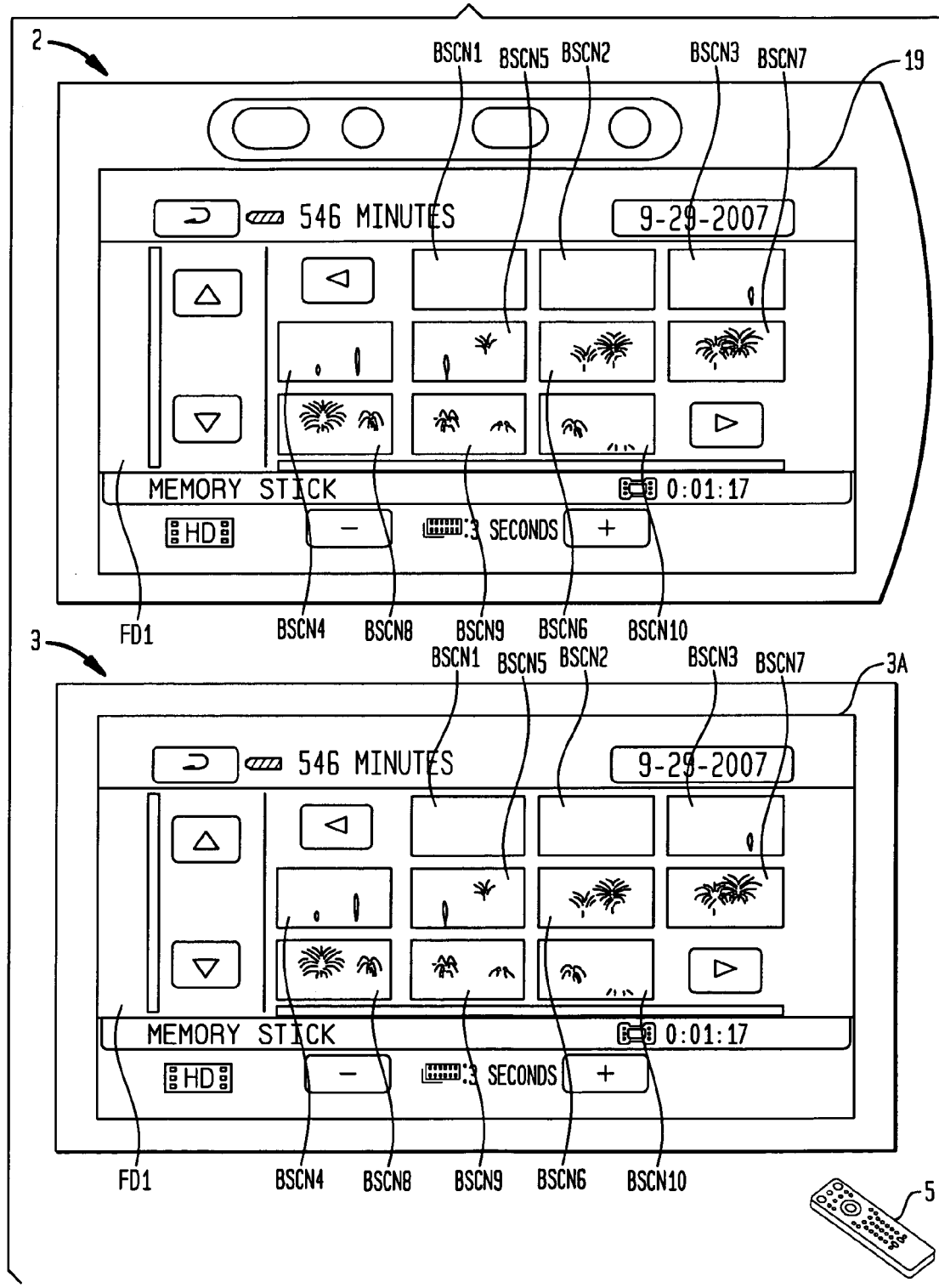
FIG. 8 is a schematic view showing a configuration of a film-index screen.

Actually, when the microprocessor 6 of the digital video camera 2 recognizes that the "film-index" button 39 of OSD has been selected from the menu screen MG1 displayed on the monitor 3A of the TV 3 by the user operation from the TV remote controller 5, the microprocessor 6 generates a film-index screen FD1 as shown in FIG. 8 base on one video content stored in the hard disc drive 16, displaying the screen on the LCD 19 as well as on the monitor 3A of the TV 3.

In the film-index screen FD1, one video content is sectioned at predetermined time intervals (for example, 3 seconds), and "scene" icons BSCN 1 to BSCN 10 indicating first scenes of the sectioned plural content portions are displayed in thumbnail view, which provides plural content portions in one video content to the user visually through the "scene" icons BSCN 1 to BSCN 10.

Accordingly, the TV 3 can display the film-index screen FD 1 supplied from the digital video camera 2 is displayed on the monitor 3A and can accept selection and determination with respect to the "scene" icons BSCN 1 to BSCN 10 of the film-index screen FD 1 from the TV remote controller 5.

Therefore, when any of the "scene" icons BSCN 1 to BSCN 10 of the film-index screen FD1 displayed on the screen 3A of the TV 3 is selected by the TV remote controller 5, the microprocessor 6 of the digital video camera 2 plays back a content portion corresponding to the selected, for example, "scene" icon BSCN1 and generates OSD superimposed playback video (not shown) in which various playback control buttons of OSD are superimposed on the playback result, displays the video on the LCD 19 and outputs it to the TV 3.

Accordingly, the TV 3 can display the OSD superimposed playback video supplied from the digital video camera 2 on the monitor 3A and can accept selection and determination with respect to various playback control buttons of OSD of the OSD superimposed playback video from the TV remote controller 5.

Next, the "face-index" button 40 of the menu screen MG1 corresponds to a face image search mode in which one video content recorded in the internal hard disc drive 16 is divided into plural content portions including respective face images of plural persons taken in the video content, and only a content portion including a most desired face image for the user can be easily searched in the video content by allowing the user to select any of the plural content portions.

Figure 9:
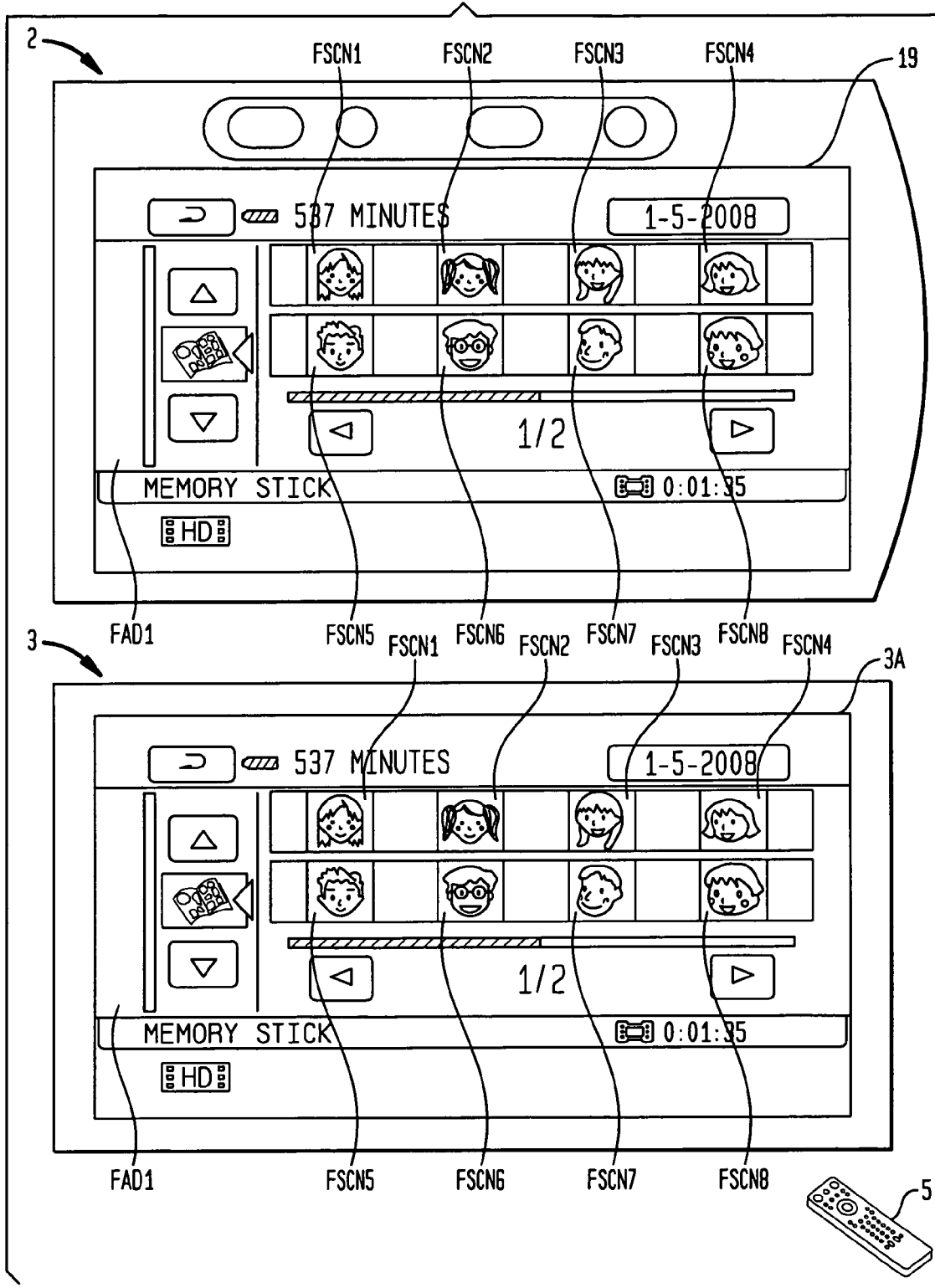
FIG. 9 is a schematic view showing a configuration of a face-index screen.

Actually, when the microprocessor 6 of the digital video camera 2 recognizes that the "face-index" button 40 has been selected from the menu screen MG1 displayed on the monitor 3A of the TV 3 by the user operation from the TV remote controller 5, the microprocessor 6 generates a face-index screen FAD1 as shown in FIG. 9 based on the optional video content stored in the hard disc drive 16, displaying the screen on the LCD 19 as well as on the monitor 3A of the TV 3.

In the face-index screen FAD1, "scene" icons FSCN1 to FSCN8 including respective face images with respect to plural persons included in one video content are displayed in thumbnail view as OSD, which provides plural content portions including respective face images to the user visually through the "scene" icons FSCN1 to FSCN8.

Accordingly, the TV 3 can display the face-index screen FAD1 supplied from the digital video camera 2 on the monitor 3A and can accept selection and determination with respect to "scene" icons FSCN1 to FSCN8 of the face-index screen FAD1 from the TV remote controller 5.

Therefore, when any of the "scene" icons FSCN1 to FSCN8 of the film-index screen FAD displayed on the monitor 3A of the TV 3 is selected by the TV remote controller 5, the microprocessor 6 of the digital video camera 2 plays back a content portion corresponding to the selected, for example, "scene" icon FSCN1 from the scene FSCN1 as the head and generates OSD superimposed playback video (not shown) in which various playback control buttons of OSD are superimposed on the playback result, displays the video on the LCD 19 and outputs it to the TV 3.

Accordingly, the TV 3 can display the OSD superimposed playback video supplied from the digital video camera 2 on the monitor 3A and can accept selection and determination with respect to various playback control buttons of OSD of the OSD superimposed playback video from the TV remote controller 5.

Lastly, the "playlist" button 41 of the menu screen MG1 corresponds to a playlist search mode in which a playlist of plural video contents selected by the user from plural video contents recorded in the internal hard disc drive 16 is made and a user's desired video content is searched and played back from the playlist by allowing the user to select any of the plural video contents in the playlist.

Figure 10:
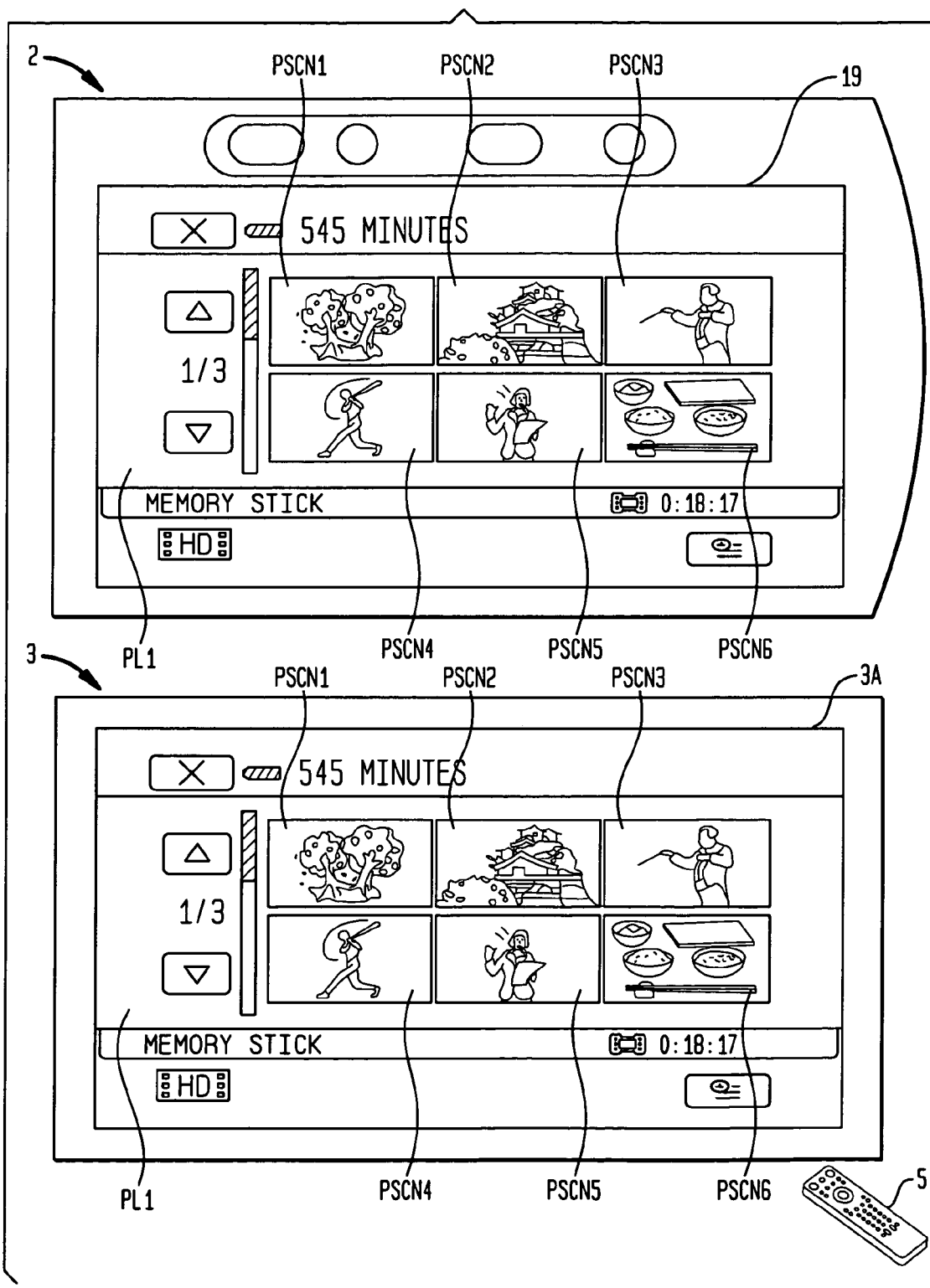
FIG. 10 is a schematic view showing a configuration of a playlist screen.

Actually, when the microprocessor 6 of the digital video camera 2 recognizes that the "playlist" button 41 has been selected from the menu screen MG1 displayed on the monitor 3A of the TV 3 by the user operation from the TV remote controller 5, the microprocessor 6 generates a playlist screen PL1 as shown in FIG. 10 based on the playlist showing plural video contents optionally selected by the user, displaying the screen on the LCD 19 as well as on the monitor 3A of the TV 3.

In the playlist screen PL1, "scene" icons PSCN1 to PSCN6 including plural scenes respectively corresponding to plural video contents registered in the playlist are displayed in thumbnail view, which provides plural video contents to the user visually through the "scene" icons PSCN1 to PSCN6.

Accordingly, the TV 3 can display the playlist screen PL1 supplied from the digital video camera 2 on the monitor 3A and can accept selection and determination with respect to the "scene" icons PSCN1 to PSCN6 of the playlist screen PL1 from the TV remote controller 5.

Therefore, when any of the "scene" PSCN1 to PSCN6 of the playlist screen PL1 displayed on the monitor 3A of the TV 3 is selected by the TV remote controller 5, the microprocessor 6 of the digital video camera 2 plays back a video content corresponding to the selected, for example, "scene" PSCN 1 and generates OSD superimposed playback video (not shown) in which various playback control buttons of OSD are superimposed on the playback result, displays the video on the LCD 19 and outputs it to the TV 3.

Accordingly, the TV 3 can display the OSD superimposed playback video supplied from the digital video camera 2 on the monitor 3A and can accept selection and determination with respect to various playback control buttons of OSD of the OSD superimposed playback video from the TV remote controller 5.

Figure 11A:
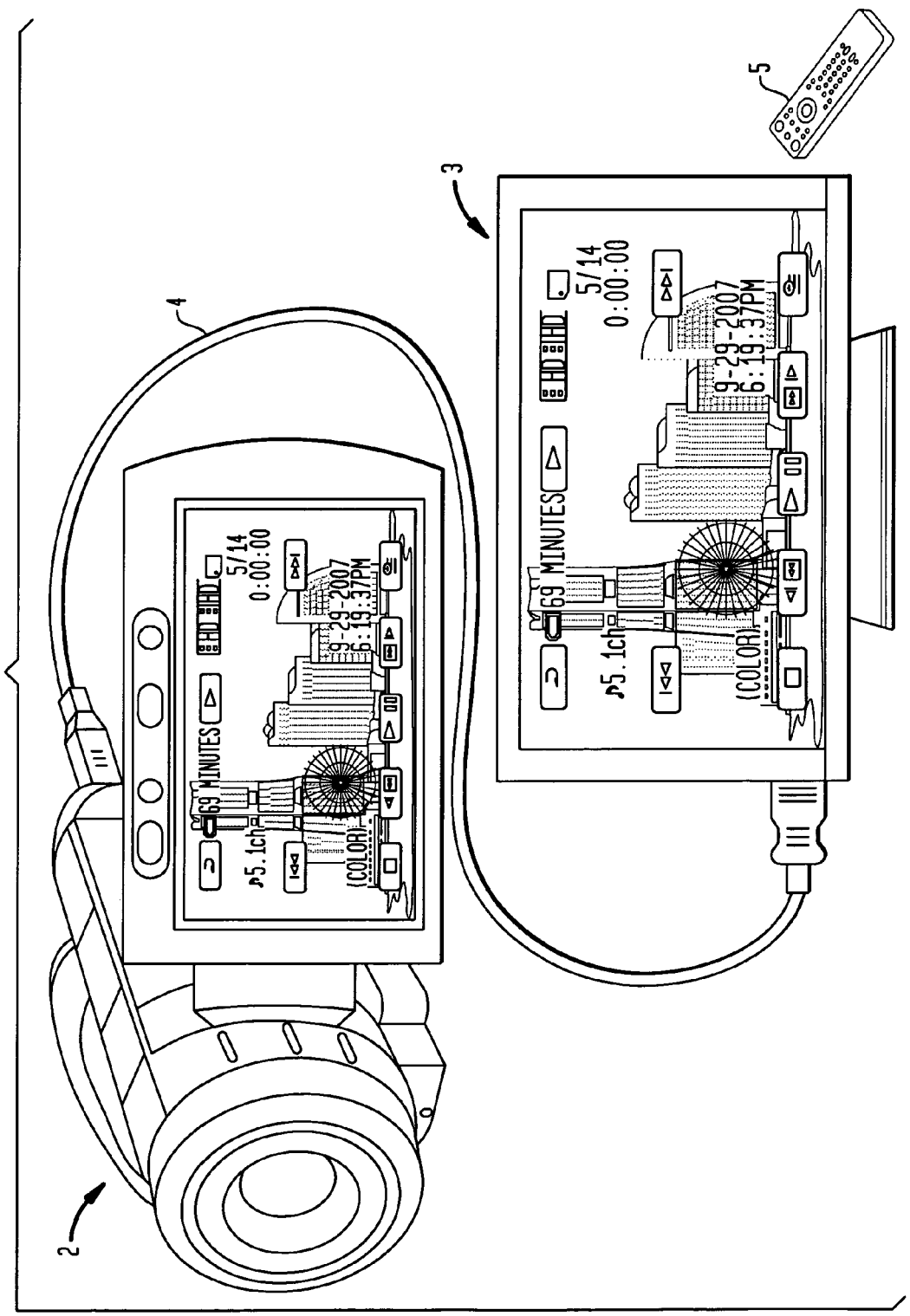
FIG. 11A and FIG. 11B are schematic views showing display states of the OSD superimposed playback video.
Figure 11B:
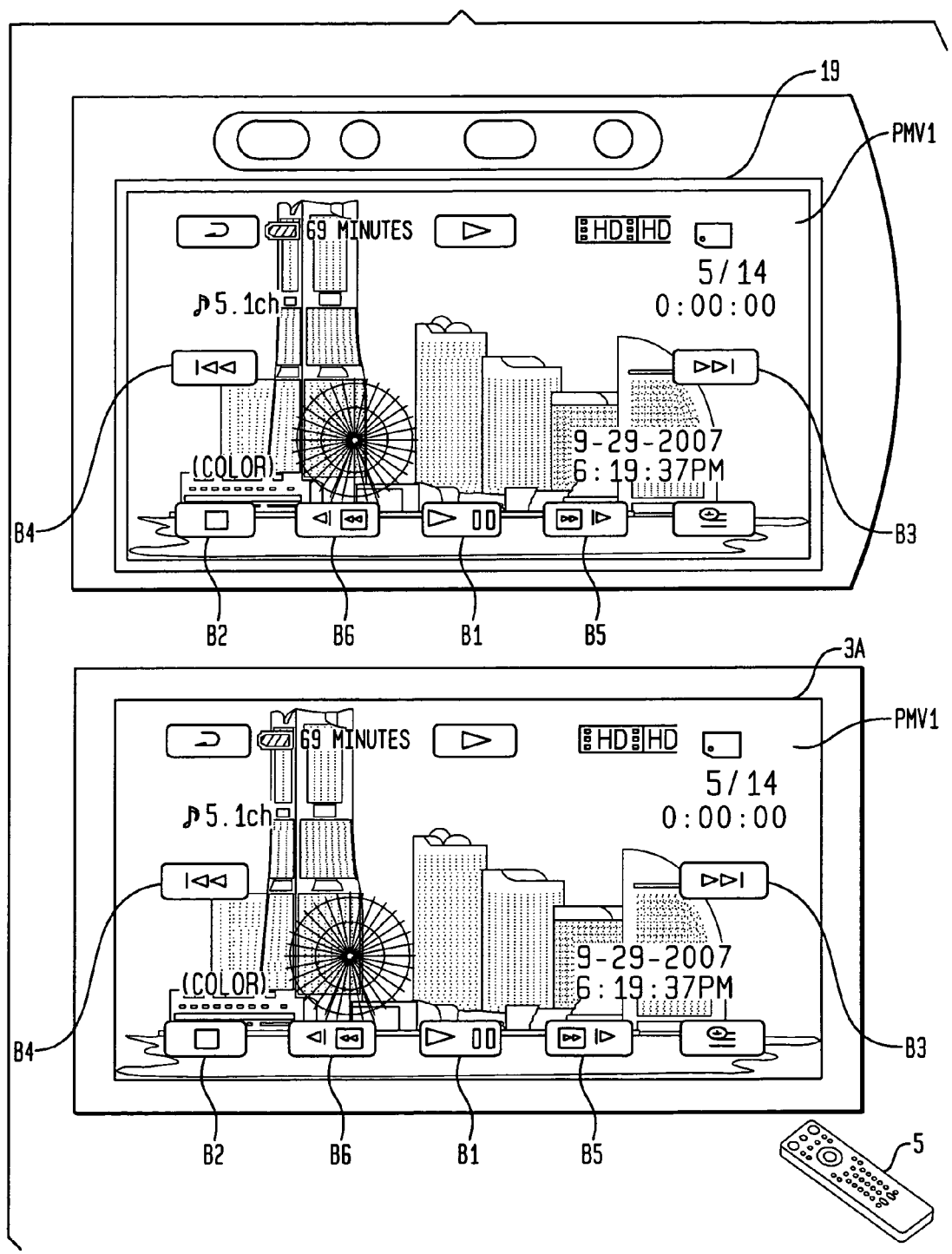

As described above, after the menu screen MG1 is displayed on both the LCD 19 and the monitor 3A of the TV 3, when any of the "visual-index" button 38, the "film-index" button 39, the "face-index" button 40 and the "playlist" button 41 in the form of OSD is selected and playback processing is started according to the selected result, as shown in FIG. 11 the micro processor 6 of the digital video camera 2 displays OSD superimposed playback video PMV1 in which various playback control buttons such as the "playback/pause" button B1, the "stop" button B2, the "fast-forward" button B3, the "fast-rewinding" button B4, the "forward-side skip" button B5, the "rewinding-side skip" button B6 are superimposed on the LCD 19 and outputs it to the TV 3 to display the OSD superimposed playback video PMV1 on the monitor 3A of the TV 3.

Figure 12A:
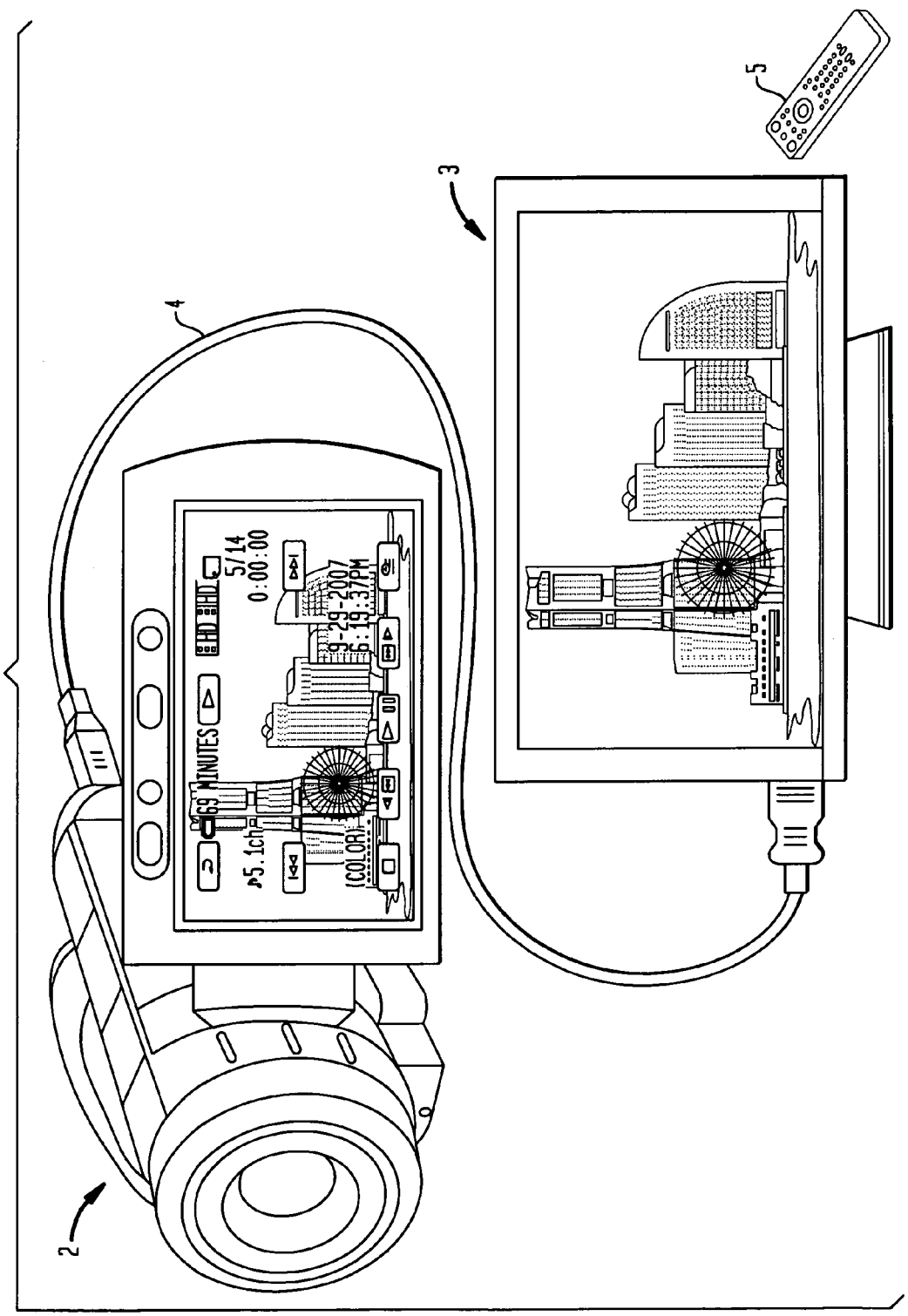
FIG. 12A and FIG. 12B are schematic views showing output stopped states of the OSD.
Figure 12B:
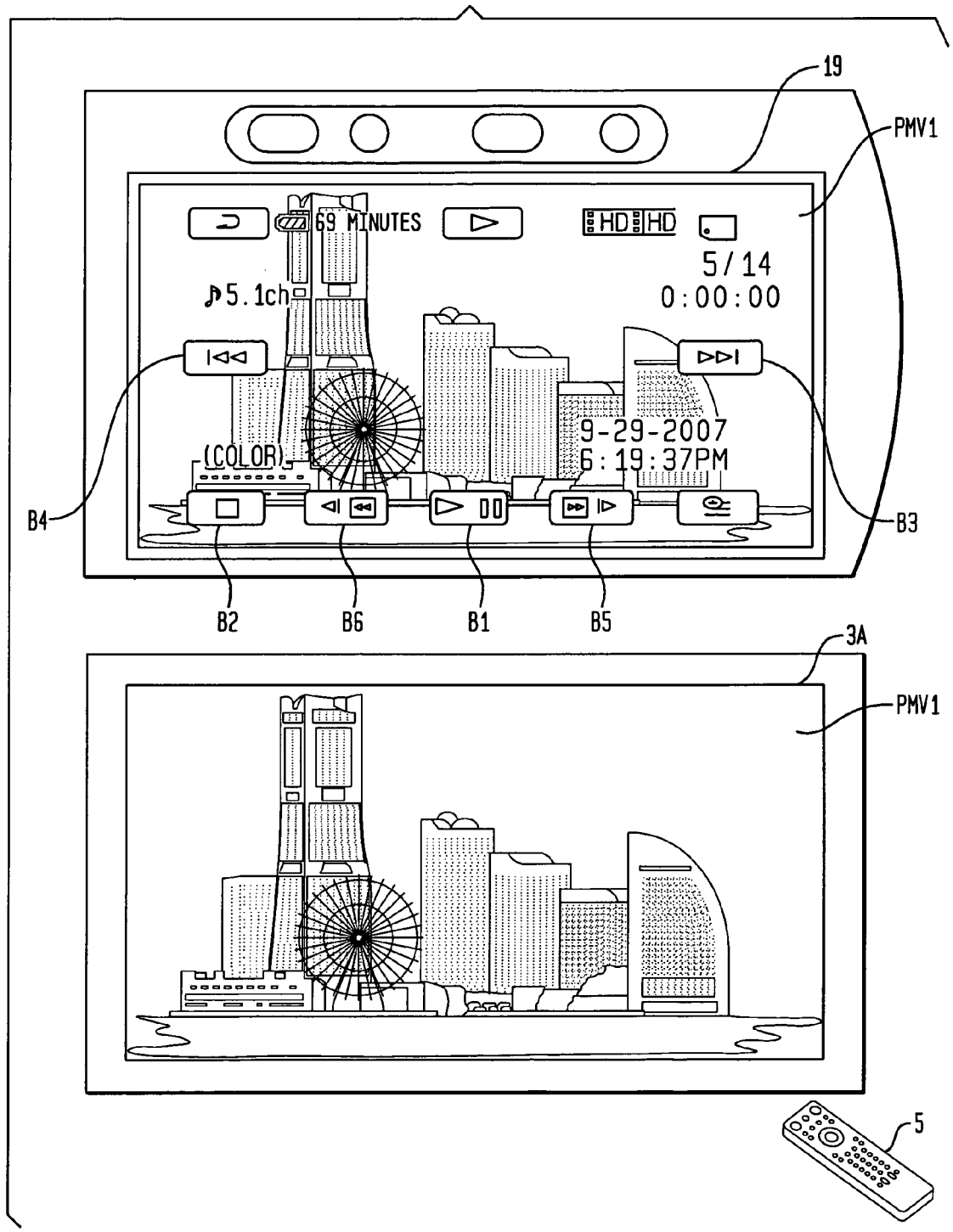

After that, when there is no operation with respect to the TV 3 from the TV remote controller 5 for a predetermined period of time (for example, 5 seconds), the microprocessor 6 of the digital video camera 2 determines that the user is not willing to operate any playback control button of the OSD superimposed playback video PMV1 and stops outputting the various playback control buttons of OSD to the TV 3 to allow the user to concentrate on viewing the playback video displayed on the monitor 3A of the TV 3, displaying playback video PMV0 in which the various playback control buttons are deleted from the OSD superimposed playback video PMV1 on the monitor 3A of the TV 3 as shown in FIG. 12B.

(4) OSD Output Control Processing Procedure

Figure 13:
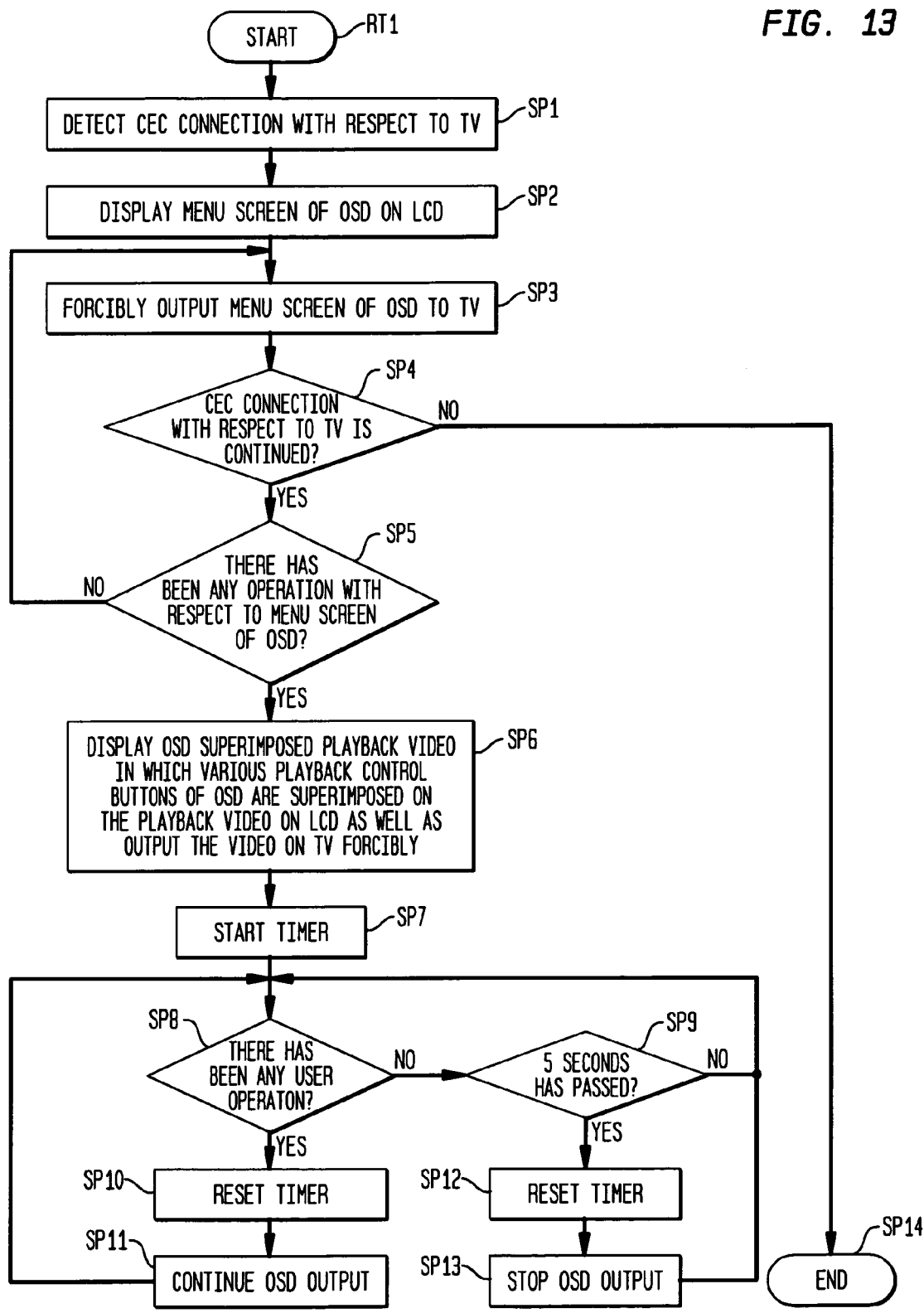
FIG. 13 is a flowchart showing an OSD output control procedure.

In the above digital video camera 2, an OSD output control processing procedure when the microprocessor 6 outputs OSD to the TV 3 in accordance with an OSD output control processing program which is an application program will be explained below with reference to a flowchart of FIG. 13.

Actually, the microprocessor 6 of the digital video camera 2 enters a routine RT1 from the start step and proceeds to the next Step SP1.

In Step SP1, the microprocessor 6 of the digital video camera 2, when detecting that the digital video camera 2 and the TV 3 have been physically connected by the HDMI cable 4 and the CEC connection has been established between the digital video camera 2 and the TV 3, proceeds to the next Step SP2.

In Step SP2, the microprocessor 6 of the digital video camera 2 displays the menu screen MG1 in which various buttons of OSD as described in FIG. 5 are provided on the LCD 19 and proceeds to the next Step SP3.

In Step SP3, the microprocessor 6 of the digital video camera 2 forcibly outputs the menu screen MG1 (FIG. 5) displayed on the LCD 19 also to the TV 3 through the HDMI cable 4 and displays the menu screen MG1 on the monitor 3A of the TV3, then, proceeds to the next Step SP4.

In Step SP4, the microprocessor 6 of the digital video camera 2 determines whether the CEC connection between the digital video camera 2 and the TV 3 is currently continued or not.

When a negative result is obtained here, it means that the CEC connection is cancelled due to factors such that the connected state between the digital video camera 2 and the TV 3 by the HDMI cable 4 has been cancelled, and that it is difficult to control the digital video camera 2 indirectly from the TV remote controller 5 through the TV 3 at the present moment, and the microprocessor 6 of the digital video camera 2 determines that it is not necessary to display OSD on the monitor 3A of the TV 3 and proceeds to Step SP14 to end the processing.

On the other hand, when an affirmative result is obtained in Step SP4, it means that the CEC connection between the digital video camera 2 and the TV 3 is currently continued, and the microprocessor 6 of the digital video camera 2 determines that it is necessary to display the OSD on the monitor 3A of the TV 3 and proceeds to the next Step SP5.

In Step SP5, the microprocessor 6 of the digital video camera 2 determines whether any operation with respect to the menu screen MG1 of OSD displayed on the monitor 3A of the TV 3 by the user has been received through the TV remote controller 5 or not.

When a negative result is obtained here, it means that any of the "visual-index" button 38, the "film-index" button 39, the "face-index" button 40 and the "playlist" button 41 in the form of OSD in the menu screen MG1 has not been selected by the TV remote controller 5 and any playback instruction with respect to the digital video camera 2 has not been inputted, and the microprocessor 6 of the digital video camera 2 returns to Step SP3 at this time and repeats the processing from Step SP3, waiting for some playback instruction to be given.

On the other hand, when an affirmative result is obtained in Step SP5, it means that selection and determination by the TV remote controller 5 has been performed with respect to any of the "visual-index" button 38, the "film-index" button 39, the "face-index" button 40 and the "playlist" button 41 in the form of OSD in the menu screen MG1, and a playback instruction for starting playback processing actually has been given, and the microprocessor 6 of the digital video camera 2 proceeds to step SP6 at this time.

In Step SP6, the microprocessor 6 of the digital video camera 2 generates, for example, the OSD superimposed playback video PMV1 (FIG. 11B) by superimposing various playback control buttons such as the "playback/pause" button B1, the "stop" button B2, the "fast-forward" button B3, the "fast-rewinding" button B4, the "forward-side skip" button B5, the "rewinding-side skip" button B6 in the form of OSD with respect to playback video of a playback result in accordance with the playback instruction, displays the video on the LCD 19, forcibly outputs it to the TV 3, then, the process proceeds to the next Step SP7.

In Step SP7, the microprocessor 6 of the digital video camera 2 counts lapsed time by a timer from the point when the OSD superimposed playback video PMV1 (FIG. 11B) was outputted to the TV 3 forcibly and displayed on the monitor 3A and proceeds to the next Step SP8.

In Step SP8, the microprocessor 6 of the digital video camera 2 determines whether the operation by the user using the TV remote controller 5 has been operated or not after the counting of lapsed time by the timer was started.

When a negative result is obtained here, it means that any user operation has not been performed by the TV remote controller 5 since the microprocessor 6 of the digital video camera 2 outputted the OSD superimposed playback video PMV1 (FIG. 11B) to the TV 3 forcibly and displayed the video on the monitor 3A, and the microprocessor 6 of the digital video camera 2 proceeds to the next Step SP9 at this time.

In Step SP9, the microprocessor 6 of the digital video camera 2 determines whether 5 seconds have passed or not since the counting of lapsed time by the timer was started, and when a negative result is obtained, the process returns to Step SP8. When the user operation by the TV remote controller 5 is detected in Step SP8, the process proceeds to the next Step SP10.

In Step SP10, since there has been a user operation by the TV remote controller 5 with respect to various playback control buttons in the form of OSD of the OSD superimposed playback video PMV1 (FIG. 11B) displayed on the monitor 3A of the TV 3, the microprocessor 6 of the digital video camera 2 stops counting lapsed time by the timer, resets a counted value, and starts counting again, then, the process proceeds to the next Step SP11.

In Step SP11, since there has been a user operation by the TV remote controller 5 with respect to various playback control buttons in the form of OSD of the OSD superimposed playback video PMV1 (FIG. 11B) displayed on the monitor 3A of the TV 3 within 5 seconds from the start of counting lapsed time by the timer, the microprocessor 6 of the digital video camera 2 determines that the probability that the next operation with respect to the TV remote controller 5 is performed by the user is high, and continues outputting the OSD superimposed playback video PMV1 in which various playback control buttons in the form of OSD are superimposed to the TV 3, then, the process returns to Step SP8.

On the other hand, when an affirmative result is obtained in Step SP9, it means that 5 seconds have been passed without user operation by the TV remote controller 5 with respect to various playback control buttons in the form of OSD of the OSD superimposed playback video PMV1 displayed on the monitor 3A of the TV3, and the microprocessor 6 of the digital video camera 2 proceeds to the next Step SP12.

In Step SP12, since there has not been a user operation by the TV remote controller 5 with respect to various playback control buttons in the form of OSD of the OSD superimposed playback video PMV1 displayed on the monitor 3A of the TV 3, the microprocessor 6 of the digital video camera 2 determines that user is willing to concentrate on viewing of the monitor 3A, without performing any operation, stops counting of lapsed time by the timer and resets a count value, and starts counting again, then, the process proceeds to Step SP13.

In Step SP13, the microprocessor 6 of the digital video camera 2 stops the OSD output by outputting only the playback video to the TV 3, without superimposing various playback control buttons of OSD on the playback video as the playback result so that various playback control buttons in the form of OSD are not displayed on the monitor 3A of the TV 3, then, the process returns to Step SP8 again.

Accordingly, when there has been a user operation in Step SP8, the microprocessor 6 of the digital video camera 2 forcibly outputs the OSD superimposed playback video PMV1 in which various playback control buttons of OSD are superimposed to the TV3 again through Step SP10 and Step SP11, repeating processing after that.

(5) Operation and Advantages

In the above configuration, when the digital video camera 2 of the playback video system 1 recognizes that the CEC connection with respect to the TV 3 has been established through the HDMI cable 4, the digital video camera 2 displays the menu screen MG1 (FIG. 5) in the form of OSD on the LCD 19 and forcibly outputs the screen to the TV 3 to display the menu screen MG1 also on the monitor 3A regardless of whether the digital video camera 2 is set so as to perform OSD output automatically or not.

Accordingly, the microprocessor 6 of the digital video camera 2 allows the user to visually check the menu screen MG1 of the digital video camera 2 forcibly displayed on the monitor 3A of the TV 3, thereby notifying that the digital video camera 2 can be controlled indirectly through the TV 3 by the operation to the TV remote controller 5.

At the same time, the microprocessor 6 of the digital video camera 2 allows the user to select and determine a menu item in the menu screen MG1 of the digital video camera 2 forcibly displayed on the monitor 3A of the TV 3 by the TV remote controller 5, thereby indirectly controlling the digital video camera 2 indirectly from the TV 3 at the time when the digital video camera 2 and the TV 3 are connected in the CEC connection immediately.

Additionally, when there has not been a user operation by the TV remote controller 5 with respect to various playback control buttons in the form of OSD of the OSD superimposed playback video PMV1 for 5 seconds while the OSD superimposed playback video PMV1 (FIG. 11B, FIG. 12B) is displayed on the monitor 3A of the TV 3, the microprocessor 6 of the digital video camera 2 performs control so that the playback video PMV0 in which the OSD output is stopped is displayed on the monitor 3A of the TV 3, thereby allowing the user who is not willing to perform playback operation to view the playback video PMV0 in which there is not any playback control button and which is easily viewable.

At this time, even when the playback video PMV0 is displayed on the monitor 3A of the TV 3, the microprocessor 6 of the digital video camera 2 consistently displays the OSD superimposed playback video PMV1 on the LCD 19, thereby using the monitor 3A which is a large screen of the TV 3 for being watched by the user as well as using the LCD 19 which is a small screen for playback control, separately.

When touch operation is performed with respect to the various playback control buttons of OSD displayed on the LCD 19 even when there has not been a user operation by the TV remote controller 5 for 5 seconds, an affirmative result can be obtained in Step SP8 in the OSD output control processing procedure in the routine RT1, and the microprocessor 6 of the digital video camera 2 can continue displaying the OSD superimposed playback video PMV1 in a state in which the OSD output is continued on the monitor 3A of the TV 3.

That is to say, the microprocessor 6 of the digital video camera 2 can continue displaying the OSD superimposed playback video PMV1 in the state in which the OSD output is continued when receiving a user operation regardless of whether the user operation has been performed by the TV remote controller 5 with respect to the monitor 3A of the TV 3 or the touch operation has been performed with respect to the LCD 19.

Since the menu screen MG1 of OSD forcibly outputted when the CEC connection with respect to the TV 3 is established is not playback video as a playback result, time limit for 5 seconds by the timer is not provided for selecting any of the "visual-index" button 38, the "film-index" button 39", the "face-index" button 40 and the "playlist" button 41, as a result, the microprocessor 6 of the digital video camera 2 can allow the user to select a playback mode without forcing the user's pace.

According to the above configuration, the digital video camera 2 of the video playback system 1 can allow the user to operate digital video camera 2 immediately by the TV remote controller 5 of the TV 3 without forcing the user to perform any complicated setting operation and the like by forcibly outputting the OSD to the TV 3 at the time when the CEC connection with respect to the TV 3 is established through the HDMI cable 4 regardless of whether the digital video camera 2 is set so as to output the OSD automatically.

(6) Other Embodiments

In the above-described embodiments, although the case in which the menu screen MG1 of OSD is outputted from the digital video camera 2 to the TV 3 forcibly when the digital video camera 2 and the TV 3 both complying with the CEC standard are connected by the CEC connection is described, the invention is not limited to this. When the digital video camera 2 which complies with the CEC standard is connected to a CEC non-compliance TV 100 which does not comply with the CEC standard through the HDMI cable 4 as shown in FIG. 14A, it is difficult that the CEC non-compliance TV 100 controls the digital video camera 2 indirectly from a TV remote controller 105, therefore, it is preferable that the menu screen MG1 of OSD is not forcibly outputted and various playback control buttons in the form of OSD of the OSD superimposed playback video PMV1 (FIG. 11B, FIG. 12B) are not outputted.

In addition, in the above-described embodiment, the case in which playback control is performed by allowing the user to select a desired playback mode through the menu screen MG1 of OSD and allowing the user to select any of various playback control buttons in the form of OSD of the OSD superimposed playback video PMV1 is described, however, the invention is not limited to this, and it is preferable that recording control is performed by allowing the user to select a recording mode through a recording menu screen (not shown) similar to the menu screen MG1 as well as through an OSD superimposed recording control screen (not shown).

Further in the above-described embodiment, the case in which OSD output is stopped when 5 seconds have passed without any user operation after the counting of lapsed time by the timer was started is described, however, the invention is not limited to this, and it is preferable to set the time limit to be various lapsed time such as 3 seconds or 10 seconds.

Further in the above-described embodiment, the case in which the microprocessor 6 of the digital camera 2 executes the OSD output control processing procedure (FIG. 13) of the routine RT1 in accordance with the OSD output control processing program which is an application program is described, however, the invention is not limited to this, and it is preferable that the above OSD output control processing procedure of the routine RT1 is executed in accordance with an OSD output control processing program installed from recording media such as a CD (Compact Disc) and a semiconductor memory, an OSD output control processing program installed from Internet or OSD output control processing programs installed from other various routes.

Further in the above-described embodiment, the case in which the invention is applied to the video playback system 1 in which the digital video camera 2 which complies with the CEC and the TV 3 which complies with the CEC are connected by the CEC connection through the HDMI cable 4 is described, however, the invention is not limited to this, and it is preferable that the invention is applied to a video playback system having standards which can perform control in connected respective devices, in which electronic devices having recording and playback functions with respect to video contents such as a digital camera, a cellular phone device, a PDA (Personal Digital Assistant), game devices which comply with the CEC are connected to electronic devices having a video display function such as a personal computer, a cellular phone device, a PDA, and game devices which comply with the CEC through cables other than the HDMI cable 4 in the same manner as the CEC connection.

Further in the above-described embodiment, the case in which the digital video camera 2 as an video output device according to an embodiment of the invention includes the OSD generation circuit 17 as an OSD generation means and the microprocessor 6 as a detection means and a forced output means, however, the invention is not limited to this, and it is preferable that the video output device according to an embodiment of the invention can include the OSD generation means, the detection means and the forced output means having other various circuit configurations.

The video output device and the control screen forced display method according to an embodiment of the invention can be applied to various electronic devices such as a digital still camera other than the digital video camera, a cellular phone device on which a video taking function and an image taking function are loaded, a notebook personal computer on which the video taking function and the image taking function are loaded, a game device on which the video taking function and the image taking function are loaded and a PDA on which the video taking function and the image taking function are loaded.

It should be understood by those skilled in the art that various modifications, combinations, sub-combinations and alterations may occur depending on design requirements and other factors insofar as they are within the scope of the appended claims or the equivalents thereof.

What is claimed is:

1. A video output device comprising:
an OSD generation means for generating OSD (On Screen Display) for controlling the device itself;
a detection means for detecting a connected state in which the device is connected to a prescribed external display device in a state realizing a mutual device control function which can perform control between devices mutually;
a forced output means for outputting the OSD generated by the OSD generation means to the external display device forcibly and displaying the OSD on a display portion of the external display device regardless of any setting of the device when detecting the connected state by the detection means; and
an OSD output means for causing the OSD to be displayed to a monitor of the video output device regardless of whether the OSD is forcibly outputted to the external display device or not, such that when the OSD is forcibly outputted to the external display device the OSD is displayed at a same time on both the display portion of the external display device and the monitor of the video output device.

2. The video output device according to claim 1,
wherein the forced output means outputs playback control buttons with respect to video stored in the video output device as the OSD.

3. The video output device according to claim 2,
wherein the forced output means stops outputting the OSD to the external display device in the case that, after some operation was performed with respect to the OSD, the next operation is not performed until a prescribed period of time has passed.

4. The video output device according to claim 3,
wherein the forced output means forcibly outputs the OSD again in the case that, after the output of the OSD was stopped, some operation has been performed with respect to the display portion of the external display device.

5. The video output device according to claim 1,
wherein the forced output means outputs the OSD in a state in which the OSD is superimposed on video to be outputted to the external display device by the video output device.

6. The video output device according to claim 1,
wherein the forced output means outputs a menu screen for selecting any of plural playback modes as the OSD when the connected state is detected by the detection means.

7. The video output device according to claim 1,
wherein the detection means detects a CEC connected state in an HDMI standard.

8. An OSD forced display method of a video output device, the method comprising the steps of:

- detecting a connected state in which the video output device and a prescribed external display device are connected in a state realizing a mutual device control function which can perform control between devices mutually by a detection means of the video output device;
- generating OSD (On Screen Display) for controlling the video output device itself by an OSD generation means when the connected state is detected in the detection step;
- outputting the OSD generated in the step of generating the OSD to the external display device forcibly by a forced output means of the video output device and displaying the OSD on a display portion of the external display device regardless of any setting of the video output device; and
- causing the OSD to be displayed to a monitor of the video output device regardless of whether the OSD is forcibly outputted to the external display device or not, such that when the OSD is forcibly outputted to the external display device the OSD is displayed at a same time on both the display portion of the external display device and the monitor of the video output device.

9. A video output device comprising:

- an OSD generation unit configured to generate OSD (On Screen Display) for controlling the device itself;
- a detection unit configured to detect a connected state in which the device is connected to a prescribed external display device in a state realizing a mutual device control function which can perform control between devices mutually;
- a forced output unit configured to output the OSD generated by the OSD generation unit to the external display device forcibly and to display the OSD on a display portion of the external display device regardless of any setting of the device when detecting the connected state by the detection unit; and
- an OSD output unit configured to cause the OSD to be displayed to a monitor of the video output device regardless of whether the OSD is forcibly outputted to the external display device or not, such that when the OSD is forcibly outputted to the external display device the OSD is displayed at a same time on both the display portion of the external display device and the monitor of the video output device.

\* \* \* \* \*